United States Patent
Cheney et al.

(10) Patent No.: US 10,638,209 B2
(45) Date of Patent: Apr. 28, 2020

(54) WIRELESS SPEAKER AND SYSTEM

(71) Applicant: ZAGG Amplified, Inc., Midvale, UT (US)

(72) Inventors: John Craig Cheney, Orem, UT (US); Andy Fathollahi, Corona Del Mar, CA (US); Bryan Richard Berrett, Highland, UT (US)

(73) Assignee: ZAGG Amplified, Inc., Salt Lake City, UT (US)

( * ) Notice: Subject to any disclaimer, the term of this patent is extended or adjusted under 35 U.S.C. 154(b) by 0 days.

(21) Appl. No.: 15/882,967

(22) Filed: Jan. 29, 2018

(65) Prior Publication Data

US 2019/0238960 A1    Aug. 1, 2019

Related U.S. Application Data

(63) Continuation of application No. 29/632,755, filed on Jan. 9, 2018, now Pat. No. Des. 864,907, which is a
(Continued)

(51) Int. Cl.
*H04R 1/02* (2006.01)
*H04R 31/00* (2006.01)
(Continued)

(52) U.S. Cl.
CPC ............ *H04R 1/025* (2013.01); *G06F 3/165* (2013.01); *H02J 7/0054* (2013.01); *H02J 7/025* (2013.01);
(Continued)

(58) Field of Classification Search
CPC ............... H04R 1/02; H04R 2201/025; H04R 2201/029; H04R 2420/07; H04R 31/00; H04R 3/12; H04R 1/1025
(Continued)

(56) References Cited

U.S. PATENT DOCUMENTS 2,967,714 A    1/1961  Calabrese
D230,489 S     2/1974  Everett
(Continued)

FOREIGN PATENT DOCUMENTS

WO    WO2015147737 A1    10/2015

OTHER PUBLICATIONS

Phil Dzikiy, "Review: Braven BRV-PRO Bluetooth Speaker", printed from web Jan. 21, 2016, http://www.ilounge.com/index.php/reviews/entry/braven-brv-pro-bluetooth-speaker.
(Continued)

*Primary Examiner* — Yogeshkumar Patel
(74) *Attorney, Agent, or Firm* — Durham Jones & Pinegar

(57) ABSTRACT

A wireless audio speaker system that includes a speaker main unit and multiple functions provided by exchangeable accessories is disclosed. The speaker main unit includes a top sleeve and a bottom sleeve that covers the external surface of a more internal enclosure that houses the main unit electronics and circuitry. External electrical and mechanical connectors are configured to be positioned on speaker unit and are adapted to being connected to the accessories. One external connector is positioned on the top sleeve for passing power and audio signals between the speaker main unit and an accessory component that is mounted to the top sleeve. A second connector is configured to be positioned on the bottom sleeve for passing audio signals between the speaker main unit and a second speaker that is stacked to the bottom sleeve via stacking plate. Multiple exchangeable accessory components are described to seamlessly supplement functionality and enhance user experience.

19 Claims, 31 Drawing Sheets

Related U.S. Application Data continuation of application No. 29/522,866, filed on Apr. 2, 2015, now Pat. No. Des. 807,324, application No. 15/882,967, which is a continuation of application No. 14/987,731, filed on Jan. 4, 2016, now Pat. No. 9,883,265.

(60) Provisional application No. 62/142,429, filed on Apr. 2, 2015, provisional application No. 62/100,043, filed on Jan. 5, 2015.

(51) Int. Cl.
| | | |
|---|---|---|
| *H04R 3/00* | (2006.01) | |
| *G06F 3/16* | (2006.01) | |
| *H02J 7/00* | (2006.01) | |
| *H02J 7/02* | (2016.01) | |
| *H02J 7/35* | (2006.01) | |

(52) U.S. Cl.
CPC ............. *H02J 7/355* (2013.01); *H04R 3/00* (2013.01); *H04R 31/00* (2013.01); *H04R 2201/025* (2013.01); *H04R 2201/029* (2013.01); *H04R 2420/07* (2013.01); *H04R 2420/09* (2013.01)

(58) Field of Classification Search
USPC .................................................. 381/332, 334
See application file for complete search history.

(56) References Cited

U.S. PATENT DOCUMENTS

| | | |
|---|---|---|
| D239,734 S | 4/1976 | Vong |
| D256,002 S | 7/1980 | Price |
| 4,582,162 A | 4/1986 | Katsuno |
| D328,746 S | 8/1992 | Ishibashi et al. |
| D334,418 S | 3/1993 | Woo |
| D336,088 S | 6/1993 | Fisher |
| D446,785 S | 8/2001 | Ohta |
| D452,490 S | 12/2001 | Shintani |
| D489,707 S | 5/2004 | Kobayashi |
| D510,927 S | 10/2005 | Harris, Jr. et al. |
| D533,163 S | 12/2006 | Takase |
| D584,288 S | 1/2009 | Kim |
| D610,571 S | 2/2010 | Jha |
| D610,573 S | 2/2010 | Joseph |
| D621,384 S | 8/2010 | Kao |
| D632,671 S | 2/2011 | Wada |
| D641,006 S | 7/2011 | Anthony et al. |
| D641,732 S | 7/2011 | Liner |
| D654,474 S | 2/2012 | Hawkins et al. |
| D655,272 S | 3/2012 | Kawase et al. |
| D655,691 S | 3/2012 | Stewart, Jr. et al. |
| D659,670 S | 5/2012 | Goetzen et al. |
| D664,120 S | 7/2012 | Larson |
| D664,121 S | 7/2012 | Larson |
| D674,779 S | 1/2013 | Joseph |
| D682,816 S | 5/2013 | Fathollahi |
| D683,718 S | 6/2013 | Brunner et al. |
| D690,287 S | 9/2013 | Belfanti et al. |
| D692,863 S | 11/2013 | Givre et al. |
| D692,864 S | 11/2013 | Givre et al. |
| D693,417 S | 11/2013 | Kim |
| D698,336 S | 1/2014 | Givre et al. |
| D700,166 S | 2/2014 | Petersen |
| D704,076 S | 5/2014 | Poandl |
| D704,678 S | 5/2014 | Katsumata |
| D708,165 S | 7/2014 | Woo et al. |
| D709,855 S | 7/2014 | Jonas |
| D710,825 S | 8/2014 | Florczak et al. |
| D711,354 S | 8/2014 | Florczak et al. |
| D711,854 S | 8/2014 | Sulzer et al. |
| D715,766 S | 10/2014 | Osborn et al. |
| D717,778 S | 11/2014 | Zermeno |
| D725,078 S | 3/2015 | Wong |
| D727,292 S | 4/2015 | Anthony et al. |
| D727,874 S | 4/2015 | Christner |
| D729,762 S | 5/2015 | Hu et al. |
| D731,465 S | 6/2015 | Khubani |
| D736,746 S | 8/2015 | Cheng |
| D738,854 S | 9/2015 | Babcock |
| D739,845 S | 9/2015 | Hwang |
| D750,595 S | 3/2016 | Weiss |
| D752,549 S | 3/2016 | Jakowski et al. |
| D762,618 S | 8/2016 | Lawrence et al. |
| D762,792 S | 8/2016 | Oliveiro et al. |
| D764,438 S | 8/2016 | Pobeda |
| D767,534 S | 9/2016 | Xiong |
| D768,958 S | 10/2016 | Dickson |
| D770,423 S | 11/2016 | Osborn et al. |
| D793,993 S | 8/2017 | Song |
| D794,604 S | 8/2017 | Cheney |
| D807,324 S | 1/2018 | Cheney et al. |
| D813,199 S | 3/2018 | Hu |
| D817,307 S | 5/2018 | Spillmann et al. |
| D817,925 S | 5/2018 | Jang et al. |
| D822,000 S | 7/2018 | Lin |
| D824,879 S | 8/2018 | Vogt, Jr. et al. |
| D827,608 S | 9/2018 | Nugent et al. |
| D830,328 S | 10/2018 | Nugent et al. |
| D834,559 S | 11/2018 | Zhang |
| D836,603 S | 12/2018 | Warden |
| D837,187 S | 1/2019 | Kasten et al. |
| D840,966 S | 2/2019 | Cheney |
| 2008/0123894 A1* | 5/2008 | Lu .................. H04R 1/403 381/394 |
| 2011/0286613 A1* | 11/2011 | Lipsky .................. H04R 15/00 381/182 |
| 2012/0170782 A1* | 7/2012 | Ettinger .................. H04R 1/028 381/332 |
| 2012/0177237 A1* | 7/2012 | Shukla ................ B29C 45/1671 381/332 |
| 2014/0029782 A1 | 1/2014 | Rayner |
| 2015/0096828 A1 | 4/2015 | Fathollahi |
| 2015/0098582 A1* | 4/2015 | Florczak .................. H04R 1/02 381/77 |
| 2015/0304757 A1 | 10/2015 | Kim et al. |
| 2016/0198247 A1* | 7/2016 | Cheney .................. H04R 1/02 381/334 |

OTHER PUBLICATIONS

Jesse Hollington, "Braven intros new speakers at CES, including the BRV-XXL and BRV-Blade LE", printed from web Jan. 21, 2016, http://www.ilounge.com/index.php/news/comments/braven-intros-new-speakers-at-ces-including-the-brv-xxl-and-brv-blade-le.

Phil Dzikiy, "Show Report: Incipio/Braven", printed from web Jan. 21, 2016, http://www.ilounge.com/index.php/ces/report/incipio-braven.

Jeremy Horwitz, "Review: Braven BRV-1 Wireless Bluetooth Speaker", printed from web Jan. 21, 2016, http://www.ilounge.com/index.php/reviews/entry/braven-brv-1-wireless-bluetooth-speaker/.

Jeremy Horwitz, "Review: Braven BRV-X Bluetooth Wireless Speaker", printed from web Jan. 22, 2016, http://www.ilounge.com/index.php/reviews/entry/braven-brv-x-bluetooth-wireless-speaker/.

Nick Guy, "Review: Braven BRV-BANK Smart Rugged Portable Power Bank", printed from web Jan. 21, 2016, http://www.ilounge.com/index.php/reviews/entry/braven-brv-bank-smart-rugged-portable-power-bank/.

Wayback Machine, AiFi Smart Stackable Sound, Jan. 6, 2015, Internet Archive Wayback Machine.

* cited by examiner

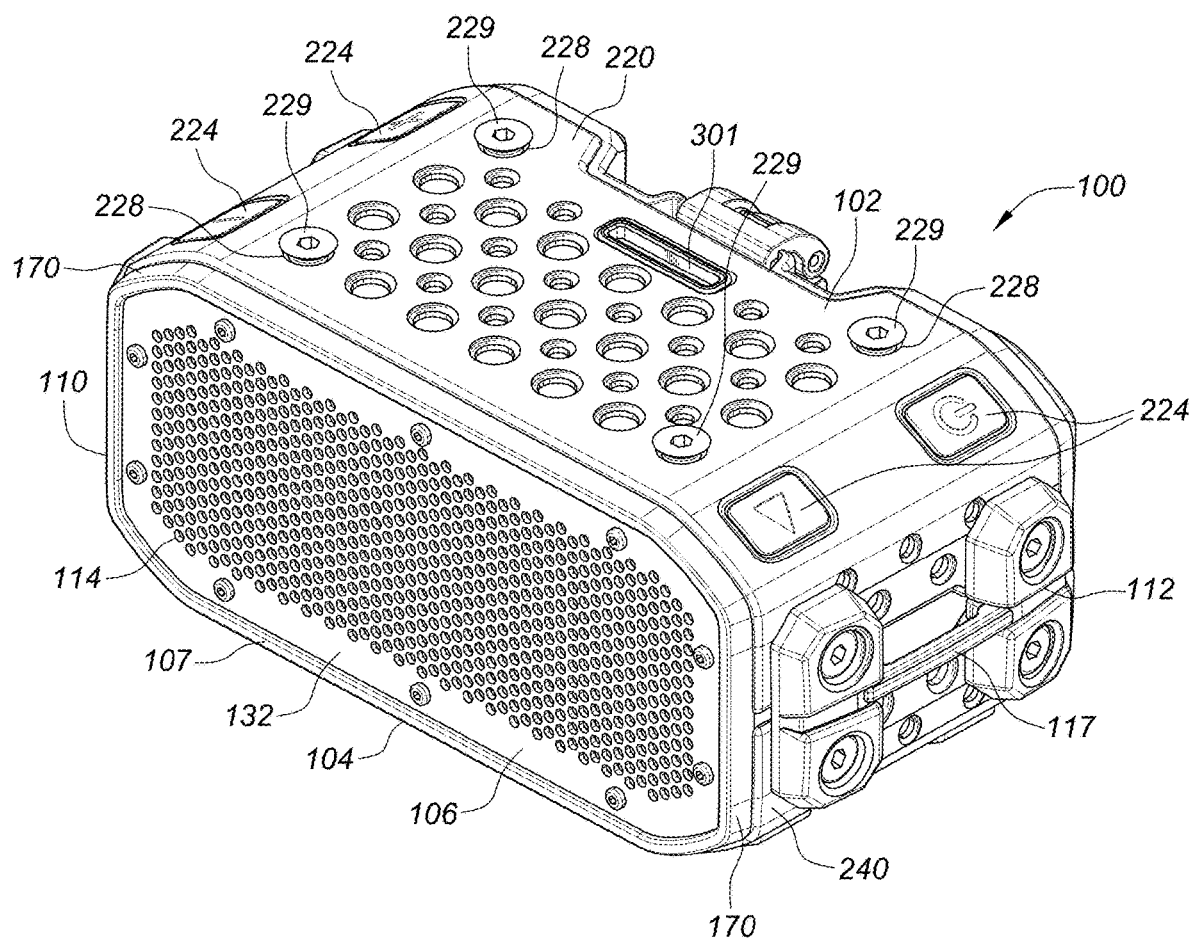
FIG. 1A1

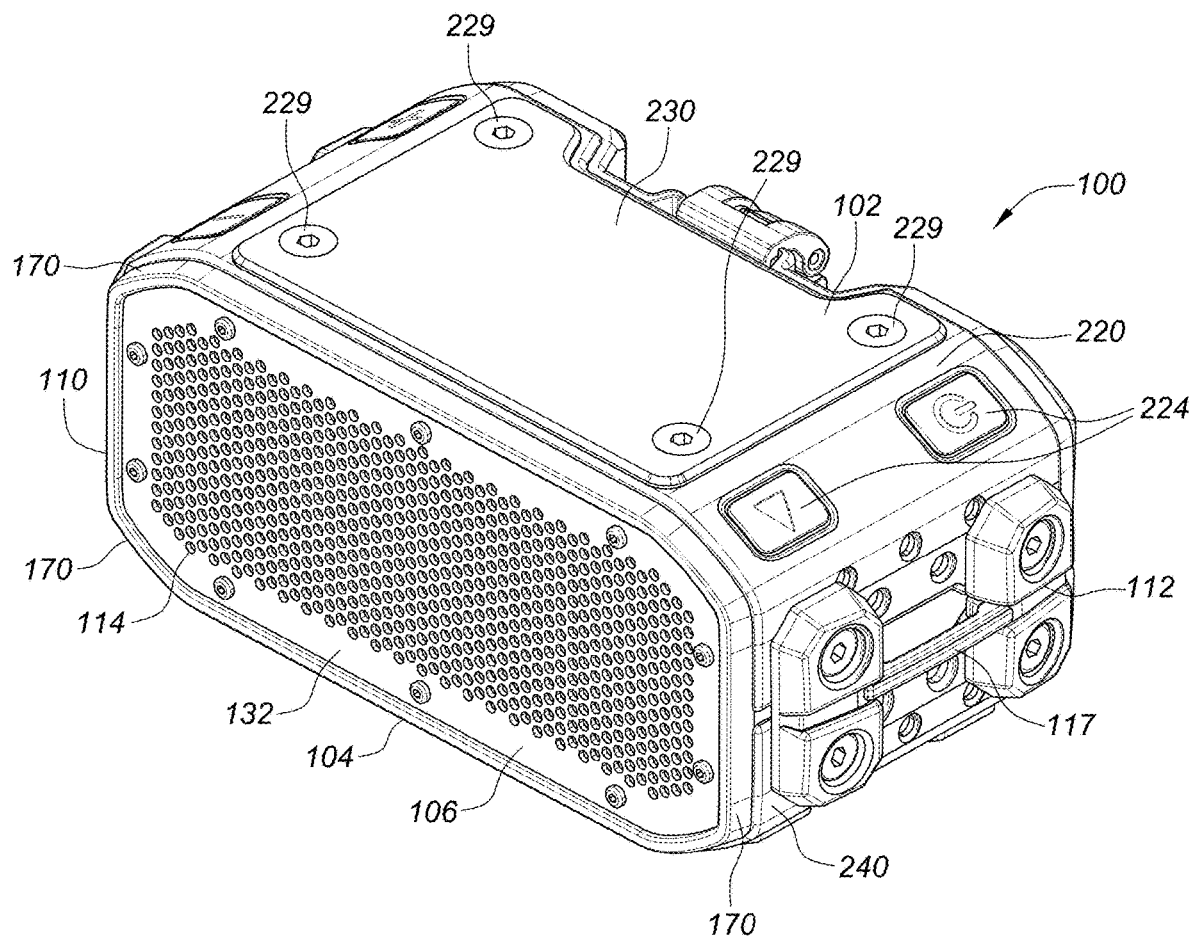
*FIG. 1A2*

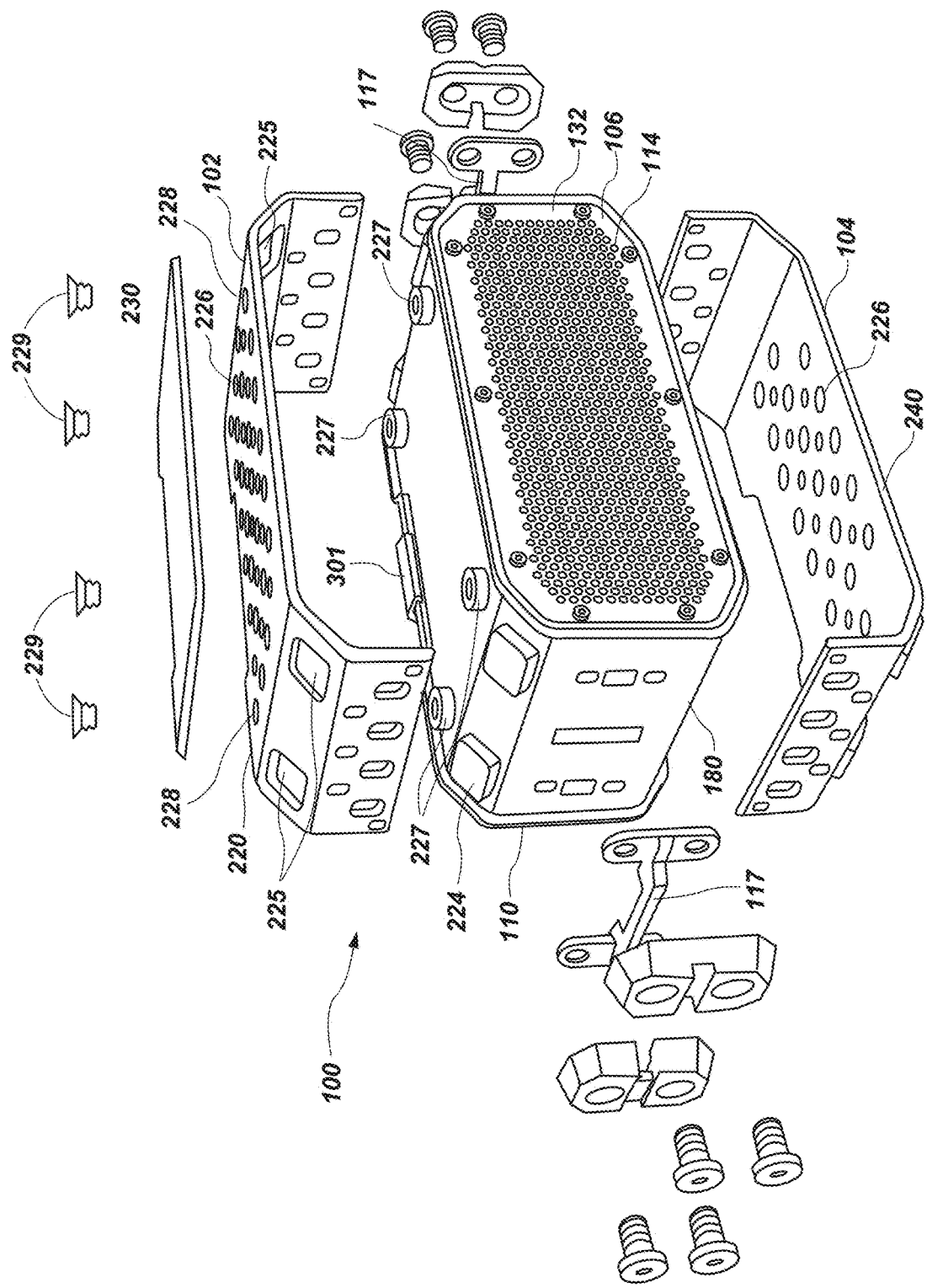
FIG. 1A3

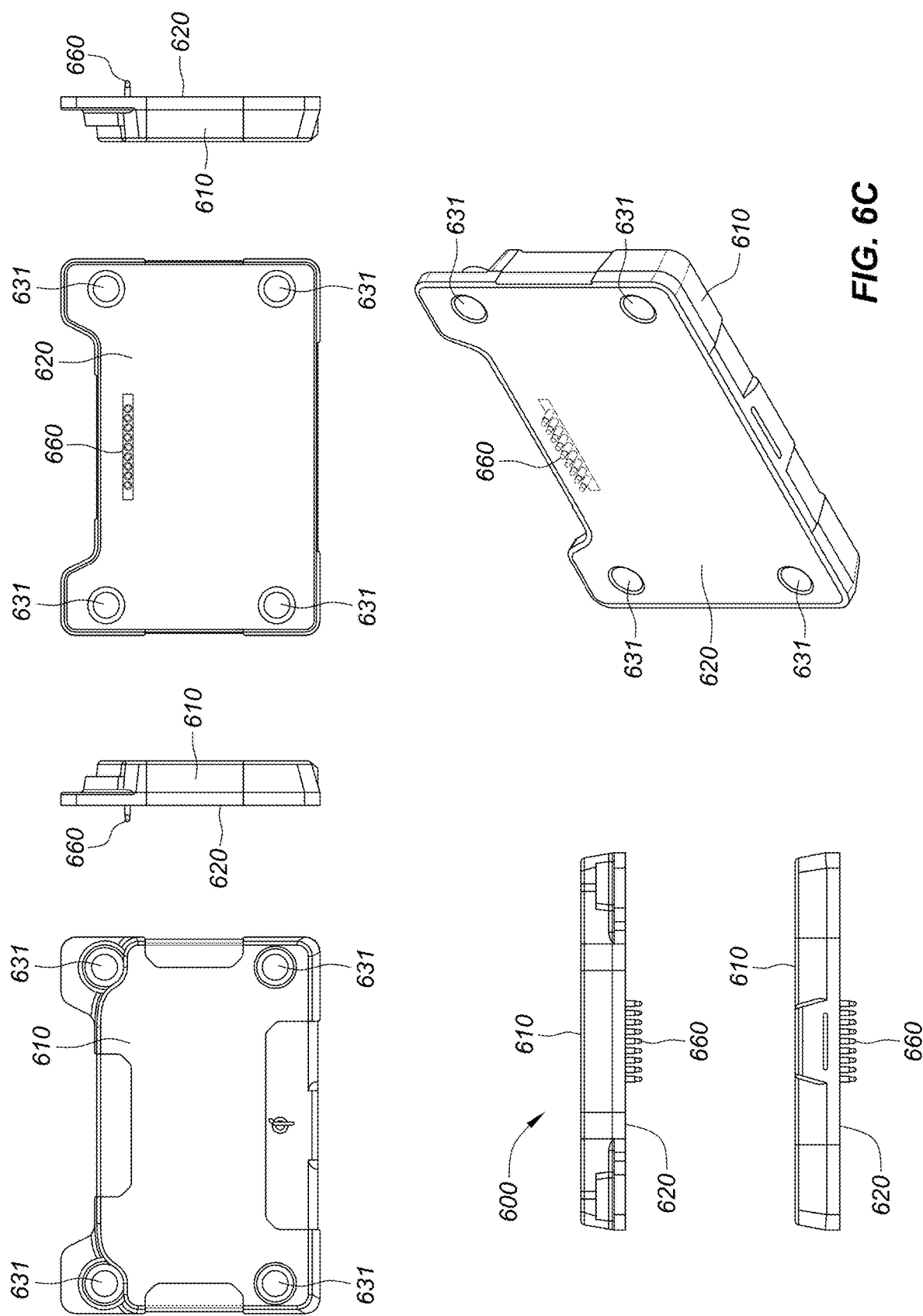

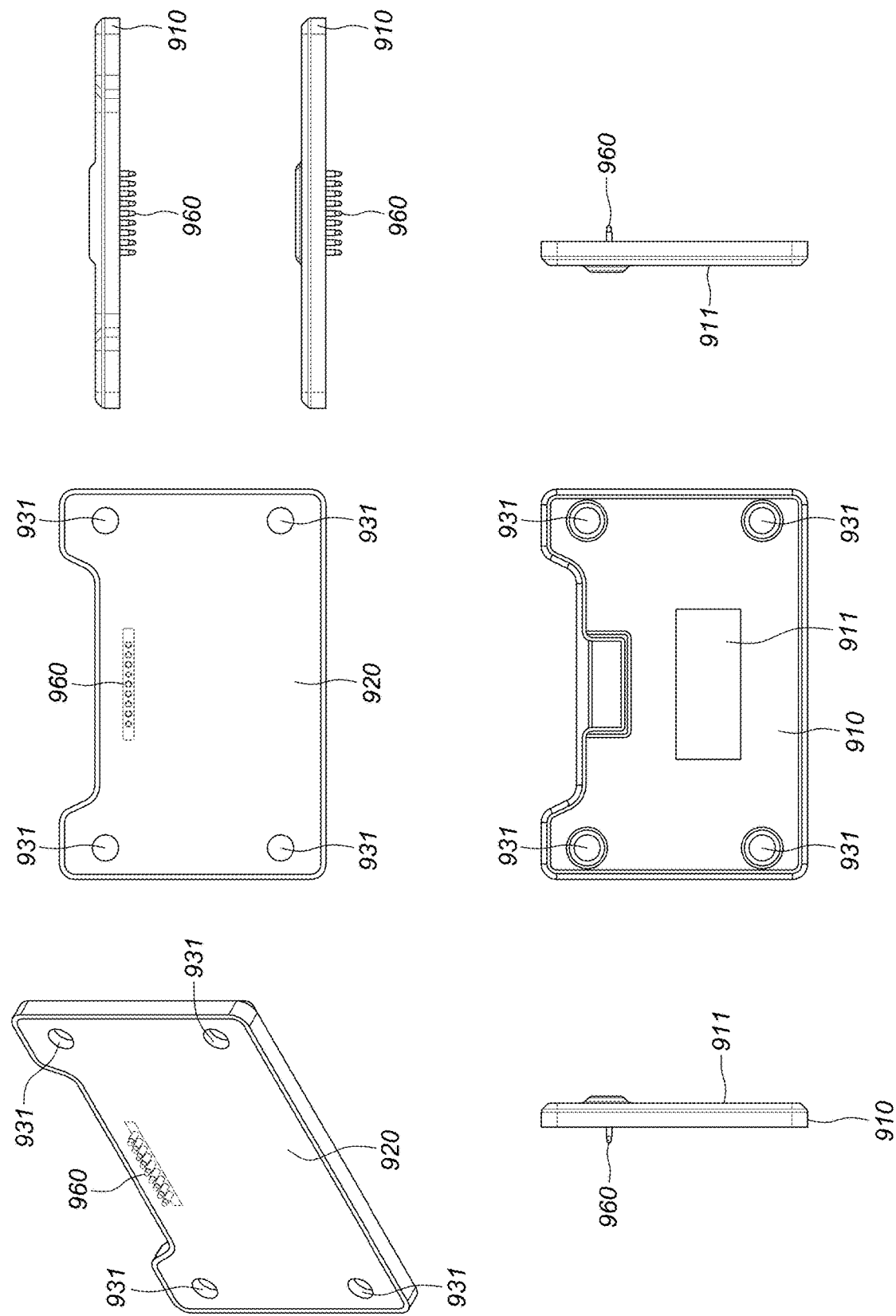

WIRELESS SPEAKER AND SYSTEM

INCORPORATION BY REFERENCE TO RELATED APPLICATIONS

This application claims the benefit of priority to U.S. patent application Ser. No. 14/987,731 titled "WIRELESS SPEAKER AND SYSTEM" and filed Jan. 4, 2016 and issued Jan. 30, 2018, which claims the benefit of priority to U.S. Provisional Application Nos. 62/100,043, filed Jan. 5, 2015 and 62/142,429, filed Apr. 2, 2015, as well as U.S. design patent application 29/522,866 filed Apr. 2, 2015 and U.S. design patent application 29/632,755 filed Jan. 9, 2018. All of the above applications are hereby incorporated herein by reference in their entirety and are to be considered a part of this specification.

BACKGROUND INFORMATION

Field

This patent application generally relates to wireless audio speakers and systems, and more specifically to wireless audio speakers and speaker systems that include a main speaker unit adapted to electrically and mechanically interface with other speaker units and/or multiple exchangeable accessories that provide additional functionality.

Description of the Related Art

These days portable wireless speakers are being used more and more in varied indoor and outdoor environments including camping, hiking, climbing, travel, leisure, beach, boating, canoeing, fishing, surfing, paddle boarding, off-road driving, and other rugged and potentially weather and water prone environments. Applicants here have recognized that such activities often require, or are enhanced by, complimentary equipment, which may vary in desirability depending on the activity. Accordingly, a need is recognized here for a portable wireless speaker system that is particularly adapted to seamlessly interface with additional accessory equipment capable of enhancing the overall user experience.

SUMMARY

The subject matter of this disclosure is generally directed to portable, battery powered, wireless speakers and speaker systems having speaker units configured to interface with other speaker units and/or exchangeable accessories having dedicated supplemental functionalities. Various aspects are described herein.

In one aspect, the speaker system includes a main or base speaker unit that includes mechanical and electrical accessory connectors or conductive connectors adapted to reversibly interface with accessory components that when attached to the base unit supplement the operational features of the system in a seamless and integrated manner. The base speaker unit includes an internal enclosure or housing that houses a rechargeable battery, wireless module, speakers, driver, passive radiator and the supporting electronic circuitry and interfaces.

In another aspect, an external sleeve is employed that wraps around the sides of the internal enclosure and provides a mechanical interface to mount the accessory components to the base unit. The external sleeve may be formed of metal, such as stainless steel or aluminum, and include multiple threaded holes adapted to receive securing screws and/or hooks and unthreaded holes and apertures that can facilitate attachment and alignment (via hooks or posts), provide access to buttons/controls, provide additional shock absorbance, and enhanced cosmetic appearance. The same mechanical accessory interface may be employed to mechanically attach different or varied accessories components. The external sleeve may be reversibly or permanently mounted to the speaker enclosure.

In another aspect, electrical interfaces positioned on the externally or outwardly positioned walls or surface of the speaker unit in the form of electrical connectors are provided at one or more defined locations on an outwardly positioned surface or wall of the base speaker unit to provide a common electrical interface that corresponds to a commonly employed connector interface on accessory components when those accessories are mounted to the base unit. The electrical connectors may be provided in one or more discrete groups and locations. The same connector may be employed to interface with multiple accessories. In a preferred implementation a first electrical connector is in the form of a multi-pin connector that includes at least one pin being allocated to transmitting power and a second electrical connector in the form of a multi-pin connector positioned in a different location than the first with none of the pins of the second electrical connector being allocated to transmitting power or current but rather limited to audio. The first multi-pin connector may be positioned on a first side of the base unit, like the top side of the base speaker unit, and the second multi-pin connector may be positioned on a different or opposite side, like the bottom side of the base speaker unit. The first multi-pin connector may have 9-pins that may include allocations to audio, ground, and power lines and unallocated or connector pins. The second multi-pin connector may have 5 pins, some of which being allocated to the detection and/or transmission of audio signals, and may also include unallocated pin(s) residing in between allocated pins.

In another aspect, each accessory component may include separate housings and circuitry contained therein and may be independently powered or configured to be powered by the base speaker unit to which it is adapted to connect to. Such accessory components may embody numerous and varied types of functionalities, each of which constitutes a separate disclosed aspect. For example, accessory components that provide a supplemental power source such as rechargeable battery pack or a solar panel to provide additional or an alternative power source to the base speaker unit are disclosed. In one implementation, a power bank accessory is configured to be charged by the solar panel or another source and may optionally be connected to the speaker and/or other accessories. Other accessories in the form of a wireless charging pad powered by the base unit to provide wireless charging to external devices such as smart phone and/or other mobile devices suitably equipped for wireless charging are also disclosed. A lamp accessory that is also powered by the base speaker unit and can provide a glow light that is particularly well-suited for the outdoors and camping is also disclosed. A mounting bracket accessory that is particularly well-adapted for mounting the speaker base unit on particularized mounting connections such as those sold as part of the GoPro® capture device line is also disclosed.

In yet another aspect, the electrical accessory connectors include a first multi-pin connector (e.g., a 9-pin connector) positioned on the top of the sleeve or a top sleeve component and second multi-pin connector with fewer pins (e.g., a 5-pin connector) positioned on the bottom of the sleeve or bottom sleeve component. The first connector is configured for passing power and/or audio signals between the speaker main unit and an accessory component that is mechanically mounted to a top sleeve element. The second connector is configured to pass audio signals from the first speaker unit to a second speaker unit that is mounted or stacked underneath the first speaker, and mounted via a stacking plate accessory that is configured to mate the two speakers top to bottom to one another.

In another aspect, the first and second electrical interface connectors on the base unit may both be of any suitable configuration. In preferred configurations the interface connectors may be female or flat contacts to avoid having unnecessary protrusions, that can be subject to accidental damage, extending from the speaker. The stacking plate accessory component would in such an implementation include corresponding male connectors on opposing sides that are adapted to being mated and received within the conductive connectors one of each of the two stacked speaker units. The female or flat connectors may be sealed via gaskets, glue, or other suitable means to mitigate water or fluid ingress.

In another aspect, the base unit may come with a user removable cover plate that covers and thereby further protects one or more of the accessory connectors (especially those that include a connector that is allocated for transmitting power) when not in use (e.g., connected to an accessory or another speaker unit). The cover plate may be configured to be mechanically attached to the outer sleeve using the same threaded holes or mechanical attachment as other accessories.

External controls including power, battery check and reset, volume controls, and play and pair (used to pair Bluetooth® wireless technology or other wireless devices) buttons are provided in user accessible locations. Various ports, including a USB port to facilitate communication to and from the unit and/or provide power to and/or from the unit to recharge or discharge the battery in the base unit and/or audio inputs including, for example a microphone and/or auxiliary inputs may also be provided. The controls and/or ports in combination with other components constitute a further aspect of the disclosed speaker and system. USB stands for universal serial bus, which is a standard that allows for supply of electrical current and data signals. Yet another disclosed aspect relates to a latched cap that is configured to cover one or more of the ports and/or external controls when such ports/controls are not in use. Connecting or mechanically attaching the cap to the speaker housing is advantageous in that it can prevent the cap from being misplaced or lost and at the same time make the cap readily available for use to cover and protect the ports/buttons residing underneath. The cap may be configured to have a water-tight seal to protect the electrical interfaces housed there-beneath. The housing may also be configured to be waterproof or resist water or liquid penetration so that the base unit can be waterproof or resistant.

Each of the foregoing various aspects, together with those set forth in the claims, described in the drawings and written description provided or otherwise disclosed in this patent document may be combined to form claims for a device, apparatus, system, methods of manufacture and/or use in any way disclosed herein without limitation.

DESCRIPTION OF THE DRAWINGS

These and other features, aspects and advantages, as to its structure, operation, and manufacture are described below with reference to the drawings, in which like reference numerals refer to like parts throughout. Though components in the figures are often illustrated to scale, emphasis of these drawings is placed upon illustrating the principles of the various inventive aspects disclosed herein. Moreover, all illustrations are intended to convey concepts, where relative sizes, shapes and other detailed attributes may be illustrated schematically rather than literally or precisely.

FIGS. 1A1-1C are various perspective and plan views of a representative fully assembled wireless portable battery powered stereo speaker base unit 100 in accordance with the teachings herein. Such a speaker may include an active driver and a passive radiator.

FIG. 1A1 is a front top side perspective view of the speaker base unit 100 with the cover plate removed and mounting screws partially threaded into holes within the top of the external sleeve and received within threads that are formed into the speaker housing.

FIG. 1A2 is a front top side perspective view of speaker unit illustrated in FIG. 1A1, with the top cover or plate attached to the top surface to cover and protect the connector thereon when not in use.

FIG. 1A3 is an exploded view of speaker unit illustrated in FIG. 1A2 illustrating the configuration and attachment of the external sleeve component and cover plate to the speaker housing via screws on the sides and top that are received into thread holes in the speaker housing.

FIG. 1C is a compilation of top and bottom plan views of the main speaker unit illustrated in FIG. 1A1 illustrating the location of the electrical/audio connector interfaces on the top and bottom surfaces and the mechanical attachment holes on the external mounting sleeve. The diagram also provides a description of the functionality of each pin in each of the electrical connectors that interface with a corresponding interface on an accessory component.

FIG. 6C is a compilation of various perspective, side, and plan views of the assembled wireless charging pad of FIGS. 6A-6B.

FIG. 9C is a compilation of various perspective, side and plan views of the assembled glow deck of FIGS. 9A-9B.

DETAILED DESCRIPTION OF THE EMBODIMENTS

Disclosed herein are stereo speakers and systems that include a base or main speaker unit that is configured to mechanically and electrically connect to accessory components that operate to perform additional dedicated functions. The embodiments disclosed herein are described in the context of a wireless, battery powered, mobile stereo speaker as such speakers are of the type commonly used in outdoor environments. However, it should be understood that the teachings herein may be applied to other types of speakers and the mounts and attachment interfaces described herein with regard to accessories may also be employed with respect to other external mounted components and/or accessories. In addition, it should be understood that the teachings herein can be applied to more than stand-alone speakers. Indeed, it is contemplated that the teachings herein can be equally applicable to any device form-factor that employs a speaker, including and not limited to keyboards, computers, cameras, PDAs, and cell phones or waterproof/water-resistant or protective cases therefore.

Figure 2B:
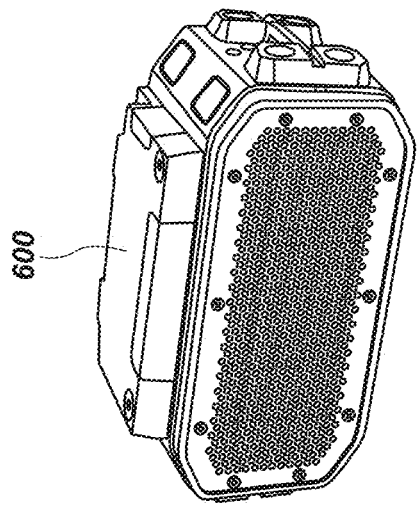
FIGS. 2A-2F are perspective views that provide an overview of six accessory components that are adapted to seamlessly interface with the speaker unit of FIG. 1A1, mechanically and for several accessories also electrically, to provide additional functionality to the base speaker unit. The six accessories are rechargeable battery pack (FIG. 2A), folding solar panel (FIG. 2B), wireless charging pad (FIG. 2C), glow deck lamp (FIG. 2D), action mount (FIG. 2E), and stack plate multiplier used to connect multiple speaker base units together one on-top of the other (FIG. 2F).
Figure 2E:
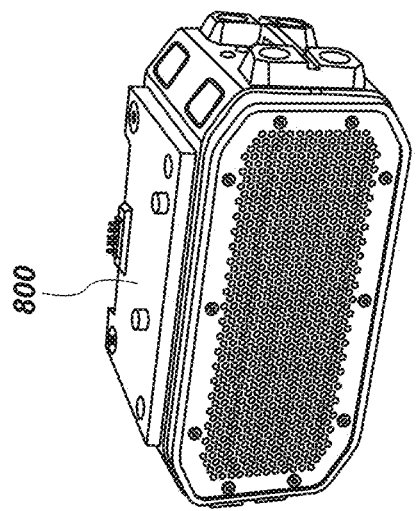
Figure 2A:
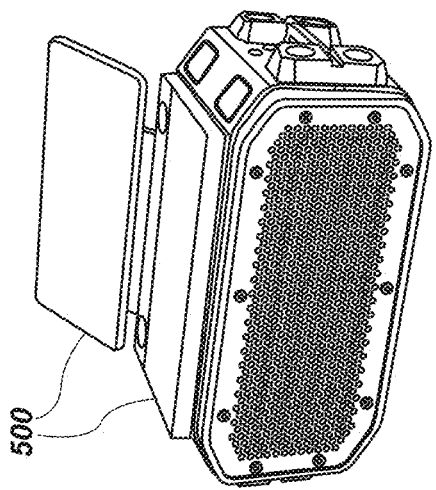
Figure 2D:
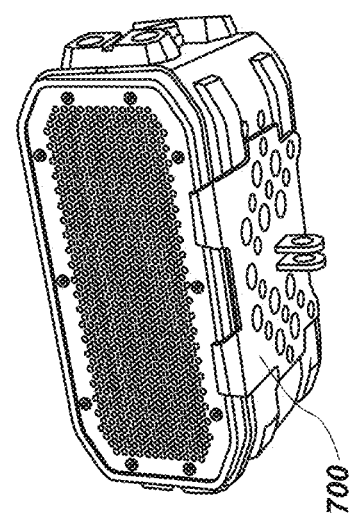
Figure 2C:
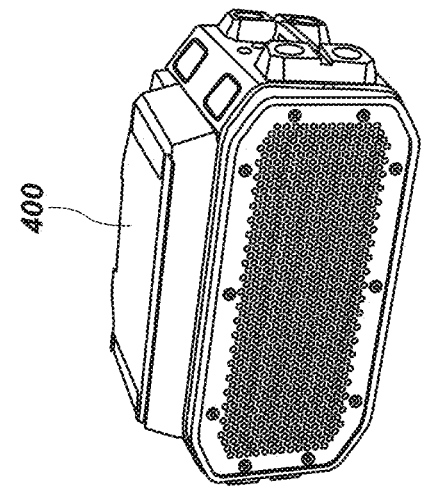
Figure 2F:
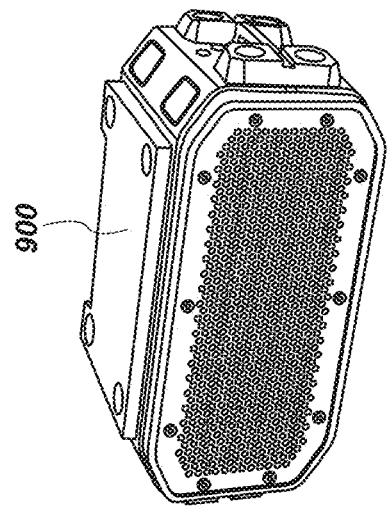
Figure 3A:
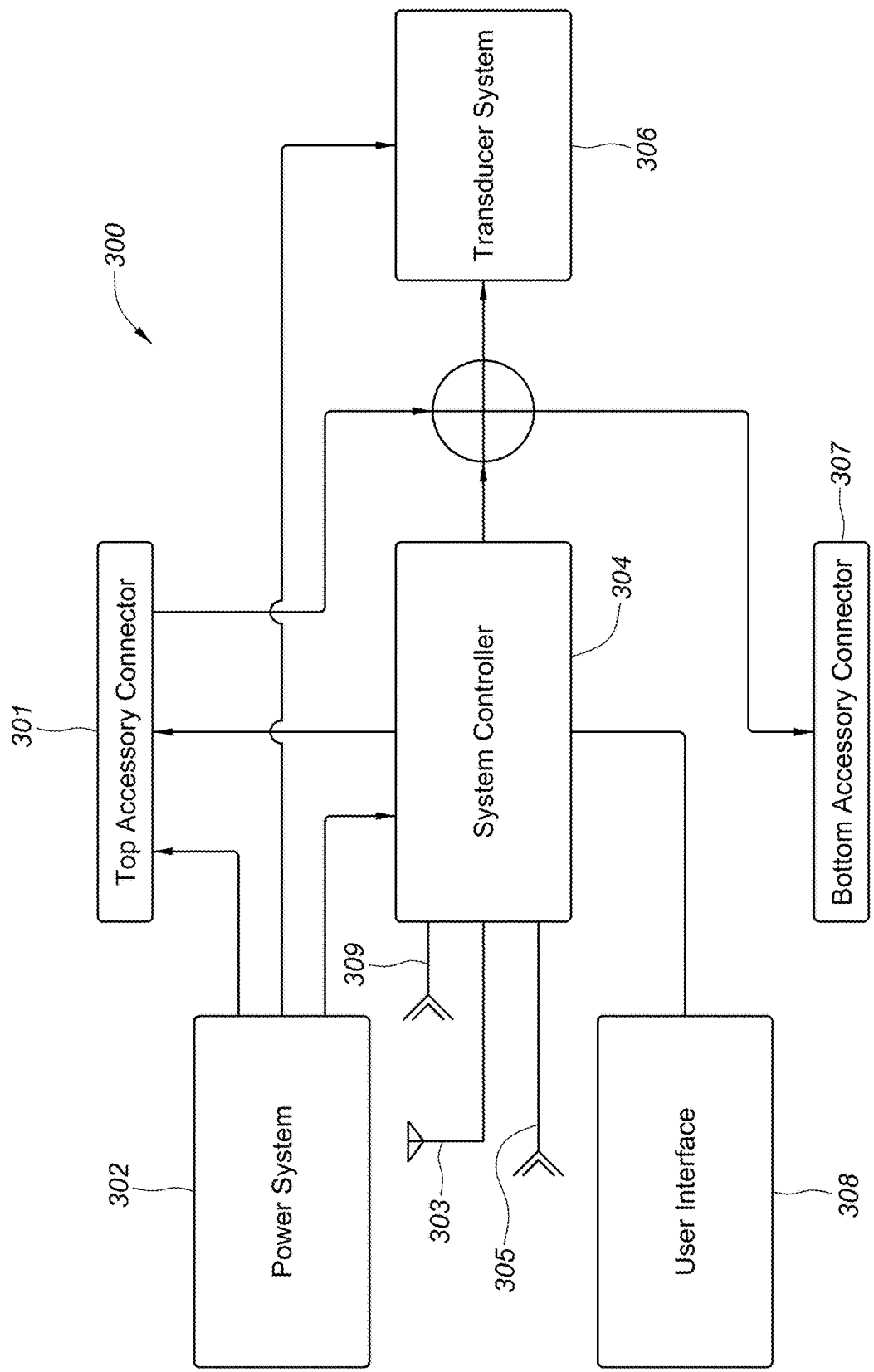
FIG. 3A is a block diagram of a representative circuit housed within the internal enclosure of the base speaker unit depicted in FIG. 1A1.
Figure 3B:
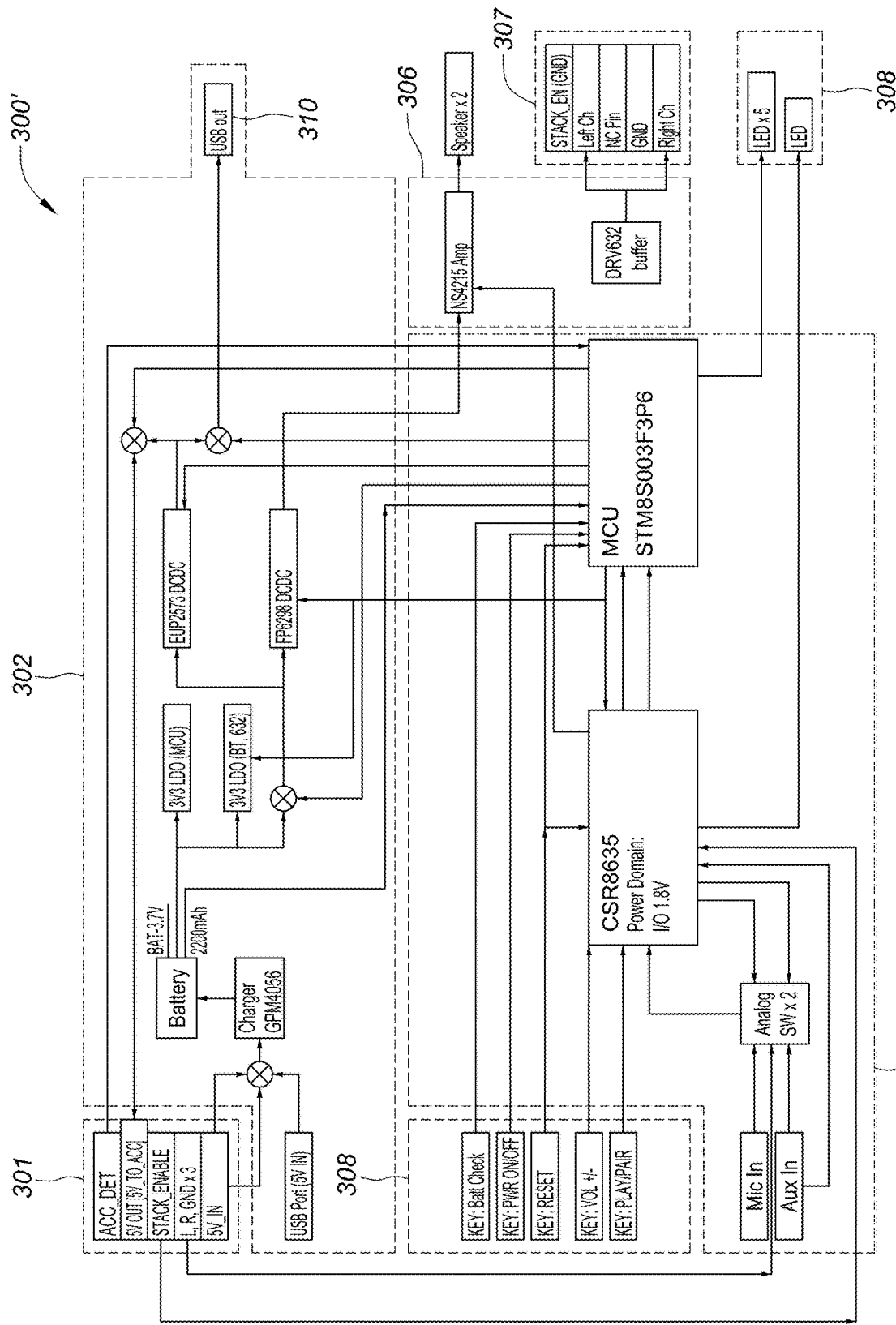
FIG. 3B is an annotated block diagram of particular circuitry and circuit components employed in an implementation of the block diagram illustrated in FIG. 3A.

As illustrated in foregoing drawings, and with particular reference to FIGS. 1A1-3, the base unit 100 includes top, bottom, right, left, rear, and front sides 102, 104, 110, 112, 108, 106, respectively and is comprised of an internal relatively rigid plastic housing or enclosure 170 that houses the speaker electronics, rechargeable battery, wireless module and various interfaces (such as those shown in FIGS. 3A-3B). The internal enclosure 170 is encased by top and bottom metal mounting sleeves 220 and 240. The mounting sleeves include numerous holes (e.g., 228, 248) some of which may or may not be threaded to facilitate mounting of the accessory components with corresponding threaded screws 229. The front side of the speaker unit includes a perforated panel 132 that forms a speaker grill behind which the speaker elements reside. The perforated panel 132 is set back from the perimeter lip or protrusion 107 of the front side 106. Multiple control buttons 224 including power, volume, and play/pair buttons are provided on the external surface. The play/pair button can have the dual function of initiating the playing of audio as well as activating the pairing mode to pair a wireless device.

As illustrated in foregoing drawings, and with particular reference to FIGS. 1A1-3, an embodiment of a fully-assembled stereo speaker base unit 100 is illustrated. As previously noted, the speaker base unit 100 includes a top side 102, a bottom side 104, a front side 106, a rear side 108, a left side 110, and a right side 112 that surround an internal housing. The front side 106 includes a perforated front cover 132 that covers the speaker elements including active driver 174. The perforations/holes 114 are provided to allow sound waves, generated by the vibration of an active driver 174 to pass through into the external environment. Although not fully depicted the active drivers 174 are generally circular cone radiators mounted on the front side 172 of the speaker chassis 180 contained within the housing 170. The speaker chassis 180 and the speaker housing 170 may be formed as a unitary co-molded structure or component, so that one is a unitary element of the other. The front cover 132, in the illustrated embodiment, is removably attached to the chassis 180 via mechanical means such as screws, rivets, or latches or via adhesive means or a combination thereof. It should be understood, however, that the front cover 132 could be co-molded with the housing 170 and/or chassis 180 so that it forms a unitary structure therewith. The chassis 180, although concealed within the housing 170 and not depicted, provides a frame that provides the primary internal support structure of the speaker unit 100 and to which the speaker radiators are mounted within apertures therein. The chassis and housing together defines the internal compartment that houses the speaker electronics, rechargeable battery, wireless module and various interfaces illustrated in FIGS. 3A-3B.

When the speaker 100 is not connected to an accessory component or another speaker, a top cover plate 230 is provided that is configured to be mounted to the top side 102 of the speaker via four screws 229 that are threaded into threaded holes 227 that are formed (e.g., co-molded) on the housing 170. In this way the cover plate 230 provides cosmetic appeal and also seal electrical contacts 301 thereunder from water and debris.

In a preferred embodiment of particular relevance for waterproof or water resistant implementations, the enclosure 170 may be configured to be sealed and water resistant or water proof. The enclosure 170 may be comprised of a unitary integrally formed polymer molded or extruded construct that includes an internal support or chassis 180 with multiple apertures for the speaker radiators and additional passage required for operation of the speaker 100, such as USB communication or charging port, power connector, audio connector, Ethernet connection, reset or control buttons or indicators, battery power indicator or controls, which in the present embodiment may be housed under a cap 120 (shown in FIG. 1C) that mates with the chassis or housing 170 and protects the electrical sockets and interfaces thereunder. In the present embodiment, the cap 120 is attached to the enclosure 170 and closed and opened via a clip and latch mechanism 122. A screw-on cap may alternatively be employed.

Figure 1B:
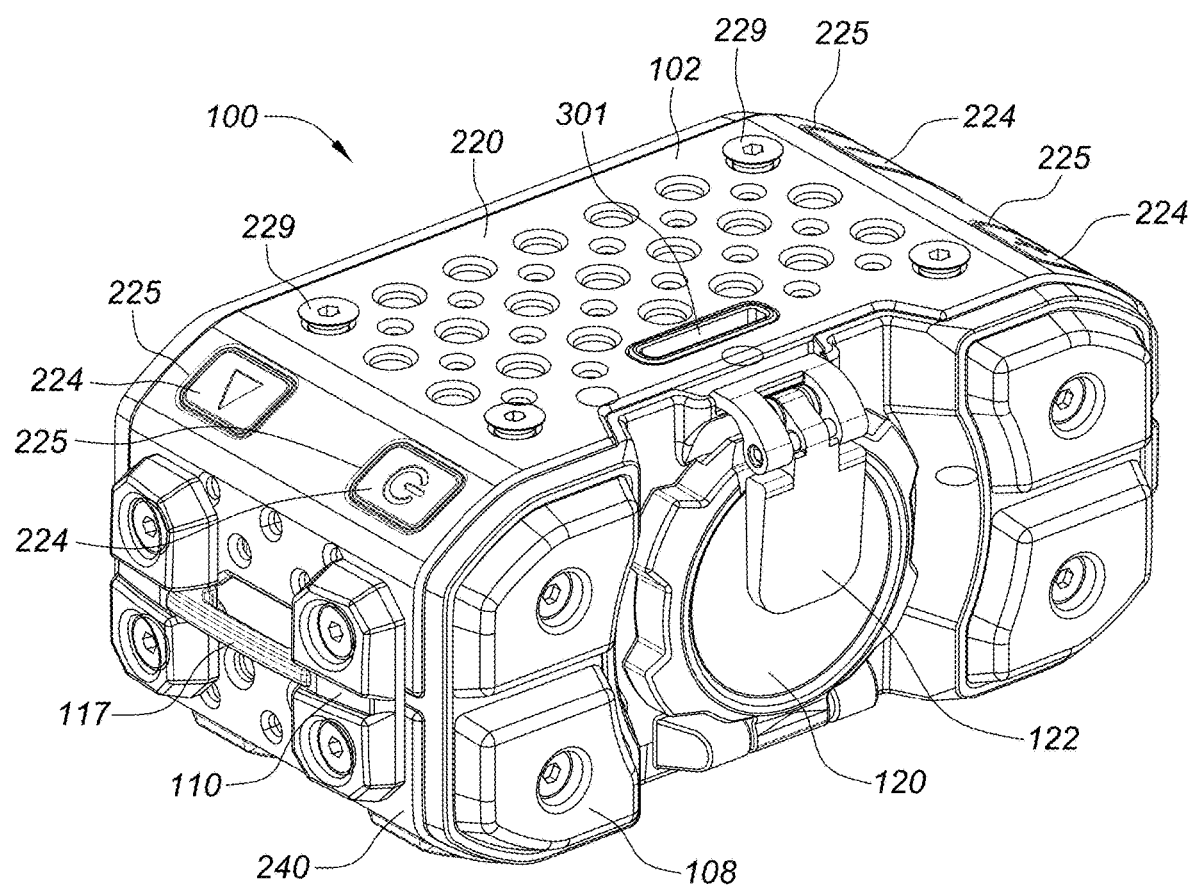
FIG. 1B is a rear top side perspective view of the speaker unit illustrated in FIG. 1A1 illustrating the top, left, and rear sides thereof.
Figure 1C:
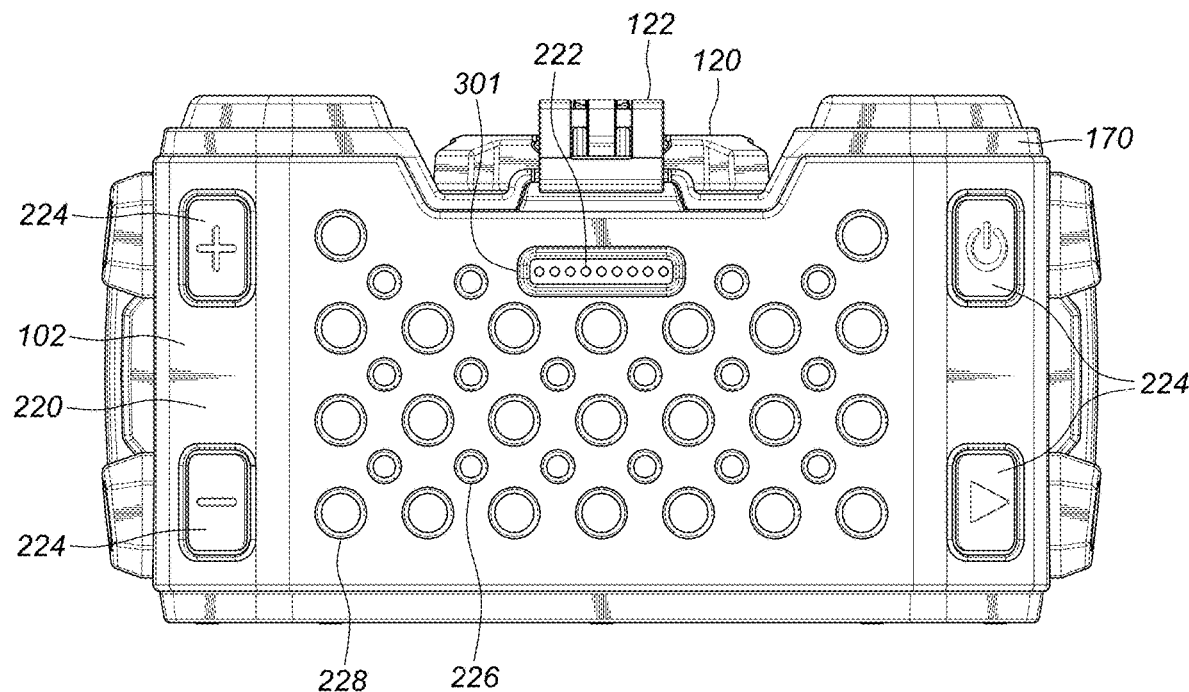
Figure 1C:
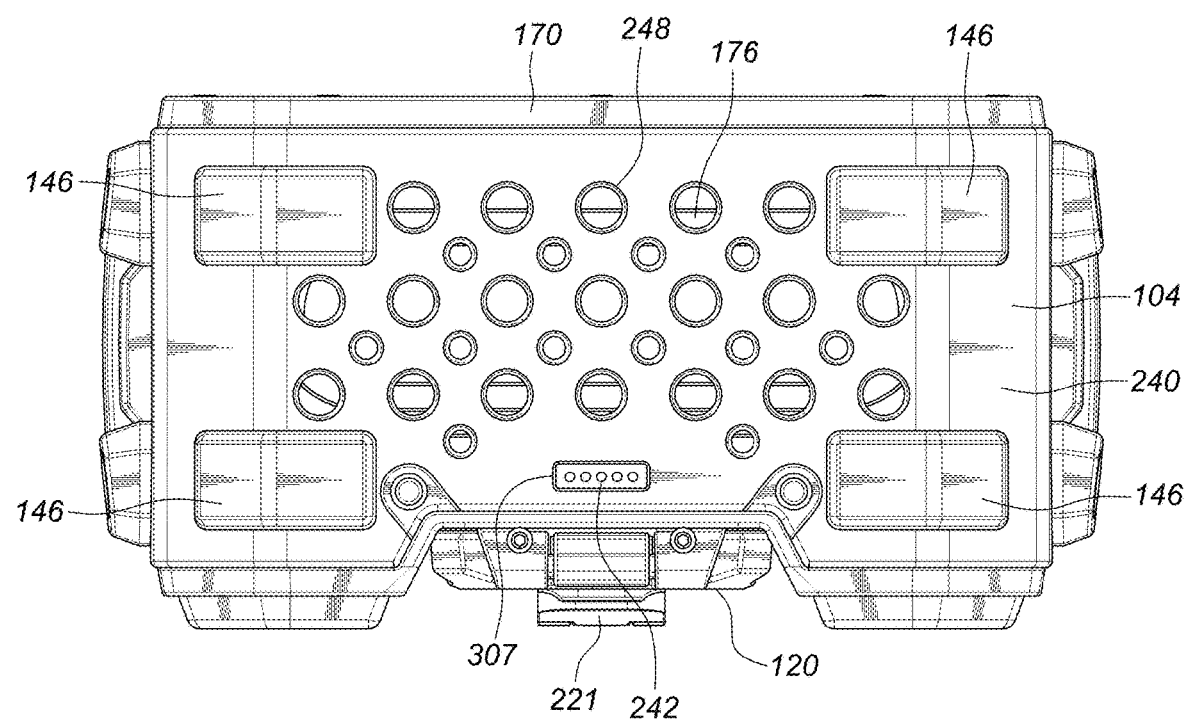

When the top cover plate 230 is removed as illustrated in FIGS. 1A1 and 1C, the 9-pin connector 301 on the top of the speaker unit 100 is revealed. The bottom side of the speaker includes a 5-pin connector 307. No cover plate is provided for the bottom side as the 5 pin connector only has audio signals and there is no power. The 5-pin and 9-pin connectors 301, 307 can be female connectors or flat contact pad connectors as shown. The 5-pin and 9-pin connectors 301, 307 can be waterproofed by, for example, using silicone gaskets or glue to seal the individual connector pins or pads and the connectors 301, 307 housing thereby limiting or impeding ingress of fluids and debris from the external environment into the connector and/or speaker housing 170.

The internal enclosure 170 is encased by top and bottom mounting sleeves 220, 240. The mounting sleeves 220, 240 are in the illustrated preferred embodiment made of metal such as aluminum or stainless steel. The metal sleeves can provide durable protection to the speaker by providing a hard, non-brittle and malleable skin to the speaker housing 170 that is mounted spaced apart therefrom. The sleeves 220, 240 may be formed of other suitable materials that may include fiber reinforced plastic or other polymer or composite materials. The top sleeve 220 externally encases most of the top side 102 of the speaker 100 around the internal housing 170 and extends over top portions of the left and right sides 110, 112 of the speaker 100. The top sleeve 220 may include apertures 225 to allow user control buttons 224, such as power on/off button, play/pair, and volume control buttons, to be accessible by the user. The 9-pin connector 301 is configured to be positioned on the top sleeve 220 for passing power and/or audio signals between the speaker main unit and an accessory that is mounted to the top sleeve.

The opposing bottom sleeve 240 externally encases the bottom side 104 of the speaker 100 around the internal housing 170 and extends over bottom portions of the left and right sides 110, 112 of the speaker 100. The 5-pin connector 307 is configured to be positioned through the bottom sleeve 240 for transmitting audio signals to an underlying speaker 100 upon which it is stacked. As well shown in FIGS. 1A3 and 1C, bottom sleeve 240 includes feet or pads 146.

As illustrated in the drawings, the top and bottom sleeves 220, 240 are configured to include round, or other shaped, holes 228, 248. Some of the holes 228 may or may not be threaded to facilitate mounting of accessories via correspondingly threaded screws 229 that engage there-through into threaded housing holes or screw anchors 227. Other holes 226 may be cosmetic or employed to reduce the weight of the sleeve. The holes 226 may also assist in providing shock absorbing capability to the speaker 100 and the internal housing 170 thereof to further protect the electronics therein. Because the sleeves 220, 240 externally encase an already sealed internal compartment housing 170, the holes do not create a sealing issue because the holes 228, 278 are only through the sleeves and not through the wall of the internal housing 170.

As shown in FIGS. 1C1-1C2, the speaker main unit 100 only has female contacts or pads connectors 301, 307. Both the 9-pin and 5-pin connectors 301, 307 are designed to be female contacts or pad connectors to avoid having connectors protruding from the speaker and thereby prevent or mitigate the likelihood of accidental damage to the connectors.

FIGS. 2A-2F respectively illustrate the speaker main unit connected to each of six accessories that can be mounted to the speaker main unit of FIG. 1A1 that operate to perform additional dedicated functions beyond that provided by the base unit alone. The accessories shown in FIGS. 2A-2F include a battery pack (or battery bank) (FIG. 2A), a folding solar panel (FIG. 2B), a Qi® wireless charging pad (FIG. 2C), a glow deck (FIG. 2D), an action mount (FIG. 2E), and a stack plate for mounting multiple speakers together (FIG. 2F). Each accessory is described separately in detail in the above drawing descriptions and in subsequent sections below.

The circuitry of the speaker 100 is now described in more detail with reference to FIGS. 3A-3B. FIG. 3A is a block diagram of a representative circuit housed within the internal enclosure 170 of the base speaker main unit 100 depicted in FIG. 1A1. FIG. 3B is a more detailed and annotated block diagram of circuit block diagram depicted in FIG. 3A. As illustrated in FIG. 3A the circuitry includes a top accessory connector 301, a power system 302, system controller 304, a transducer system 306, a bottom accessory connector 307, a user interface 308 and Bluetooth connection 303, a line input 305, and a microphone 309 that are connected to the system controller 304, as illustrated. Accessories can be attached to the speaker through the top accessory connector 301 and through mounting to the bottom of the speaker. Additional speakers can be connected to one-another via the bottom accessory connector 307 as further described.

Generally, an accessory attached to the stacking connector 301 can provide power or audio input to the speaker. The attached accessory can also receive power from the speaker or receive communication from the speaker 100. The speaker can provide power to an accessory through the top stacking input 301 or through a USB output 310. Power to the accessories can be toggled by holding and releasing a power button 224 for less than a predetermined period of time, for example, one second.

A separate stacking plate 800 allows two speakers to attach together through the bottom connector 307 of the master and through the top connector 301 of the slave speaker. Audio from the master speaker is then played though the bottom slave speaker.

Audio comes into the speaker via the top stacking connector 301, Bluetooth (or other wireless) connection 303 or through the line input 305. When audio is received from the top stacking connector 301, it can be routed directly to the audio transducer system 306 without any intervention from the system controller 304. As well shown in FIG. 3A, audio received from the top stacking connector 301 can also be routed directly to bottom accessory connector 307. When audio is received from Bluetooth or through line input, the system controller can route the audio to the audio transducer system and bottom accessory connector 307, as well shown in FIG. 3A.

In addition to playing audio via Bluetooth 303 or line input 305, the system can perform as a speaker phone using the microphone 309.

The power system 302 comprises a USB input port (5V_IN), a rechargeable battery, a charger (e.g., GPM4056), low-dropout regulators (e.g., 3V3 LDO [MCU] and 3V3 LDO [BT, 632]), a 5V DC/DC converter (e.g., EUP2573), a DC/DC boost converter (e.g., FP6298), and a USB out port. The rechargeable battery can be charged via the charger, which receives power either from the 5V_IN line of the top stacking connector 301 or through the USB input port. The battery in turn can provide power to the low-dropout regulators, one of which can be always enabled and provides power to a microcontroller (MCU, e.g., STM8S003F3P6), and another can be enabled/disabled by the MCU, which provides power to the other components of the system such as the Bluetooth (BT) controller. The battery can also provide power to the DC/DC converter, which in turn provides power to the top stacking connector 301 and the USB charging output. The 5V output to the top stacking connector 301 and the USB output can be enabled/disabled via the MCU. The DC/DC boost converter can be powered by the battery and can be enabled/disabled by the MCU. Depending on the level of the incoming audio signal, the battery also supplies power directly to an audio amplifier (e.g., NS4215).

The system controller 304 can be composed or comprised of a microphone input ("mic in"), an auxiliary input ("aux in"), an analog switch, a Bluetooth module (e.g., CSR8635) and the MCU (e.g., STM8S003F3P6). The system controller 304 can arbitrate among the aux in, mic in and Bluetooth module, perform audio equalization and send the audio signal to the transducer system 306. If the STACK_ENABLE input on the top accessory connector 301 is active, then audio signal can also be sent to a buffer (e.g., DRV632) and then through the bottom accessory connector 307. The system controller 304 can monitor the status of the battery and updates the LEDs (5 in this exemplary implementation) of the user interface 308 to indicate the status of the battery. When the system battery capacity is below 30%, the system controller 304 can disable the 5V OUT to the top stacking connector 301 and to the USB output to preserve power to operate the speaker components. The system controller 304 can also control the power/pair LED of the user interface 308 to indicate the status of the speaker. When the user presses any of the buttons, the system controller 304 can process the intent. The system controller 304 can also communicate to an installed accessory connected to the top accessory connector 301.

The user interface 308 can be composed or comprised of user I/O buttons (e.g., Battery Check, Power On/Off, Reset, Vol+/− and Play/Pair), Battery check LED, and power/pair LED. The Battery check, LEDs and reset buttons as well as the USB ports may be located under the cap 120 so that access would require removal of the cap 120. When the user presses the Battery Check button, the system controller 304 can display the battery level on the 5 LEDs. When the user presses the Power On/Off button, the system controller 304 can determine whether to power on the system completely or toggle power to the top accessory connector 301 and USB output. The Reset button can cause the system controller 304 to reset. The Vol+/− keys can change the volume of the audio with a short press and skip tracks with a long press. The Play/Pair button can have several functions, for example, play/pause music, answer/hang up/reject phone calls, initiate Bluetooth pairing, cancel Bluetooth pairing or factory reset the speaker, depending on the status of the speaker. The LED lights provide visible means by which the user can determine and operation status of the system.

The transducer system 306 can be composed or comprised of an amplifier (e.g., NS4215) and audio drivers. The amplifier can receive an analog audio signal from the system controller 304 and amplify the signal. The output can be heard on the audio drivers.

The top accessory connector 301 can allow for the attached accessory to pass power into the power system 302, pass power from the power system 302 to the accessory, pass audio signals from the accessory to the transducer system 306, or allow for communication to the accessory from the system controller 304. When the ACC_DET pin is active, the system controller 304 can allow power to pass from the power system 302 to the accessory. When the STACK_ENABLE pin is active, the system controller 304 can pass audio signals from the accessory to the transducer system 306.

The bottom accessory connector 307 can pass audio signals from the system controller 304 to an attached accessory.

The block diagrams 300, 300' are only representative of an implementing circuit. Other circuits may also be designed to effectuate the same or similar user functionality.

Figure 4A:
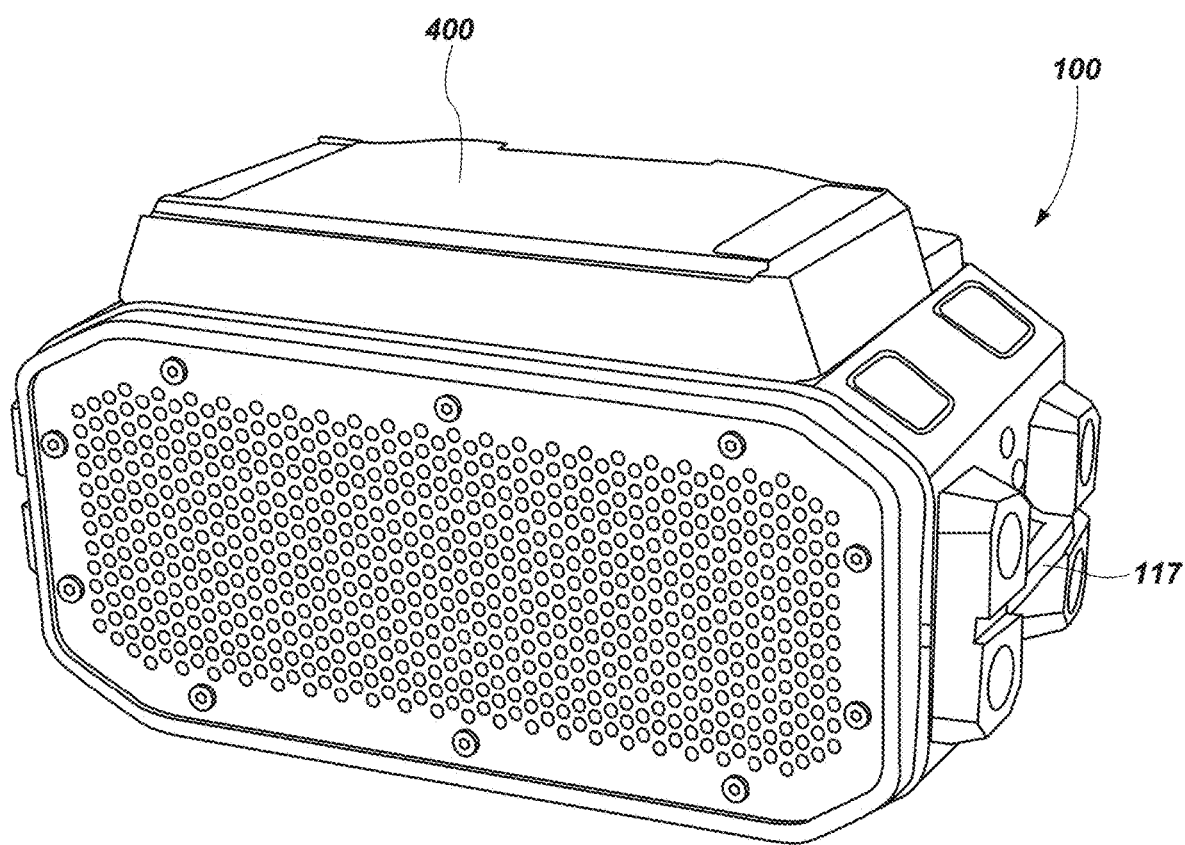
FIG. 4A is a front top side perspective view of the speaker unit of FIG. 1A1 with the cover plate removed and the battery bank accessory 400 mounted thereto.
Figure 4B:
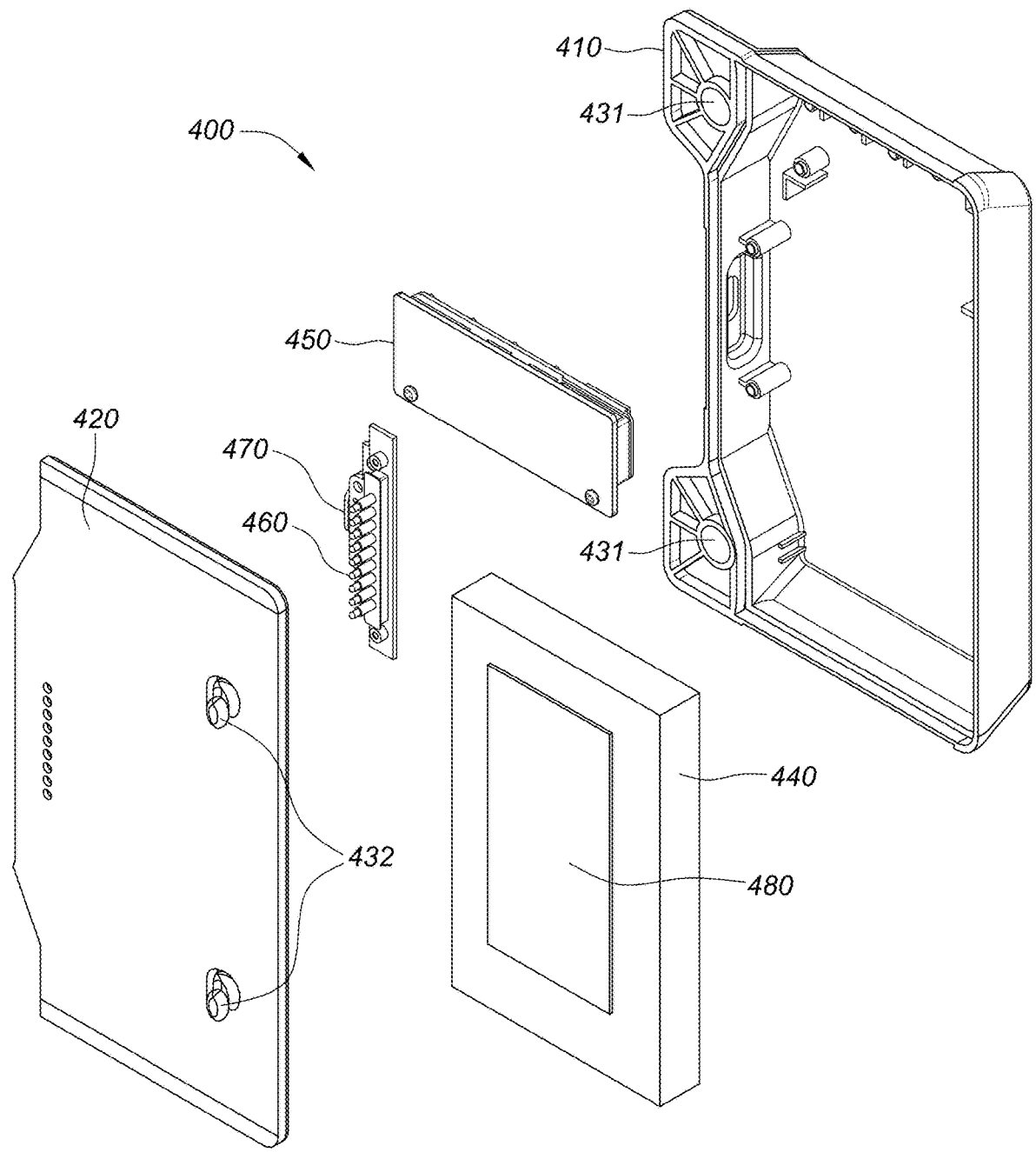
FIG. 4B is an exploded view of the battery bank accessory of FIG. 4A illustrating the various components thereof.
Figure 4C:
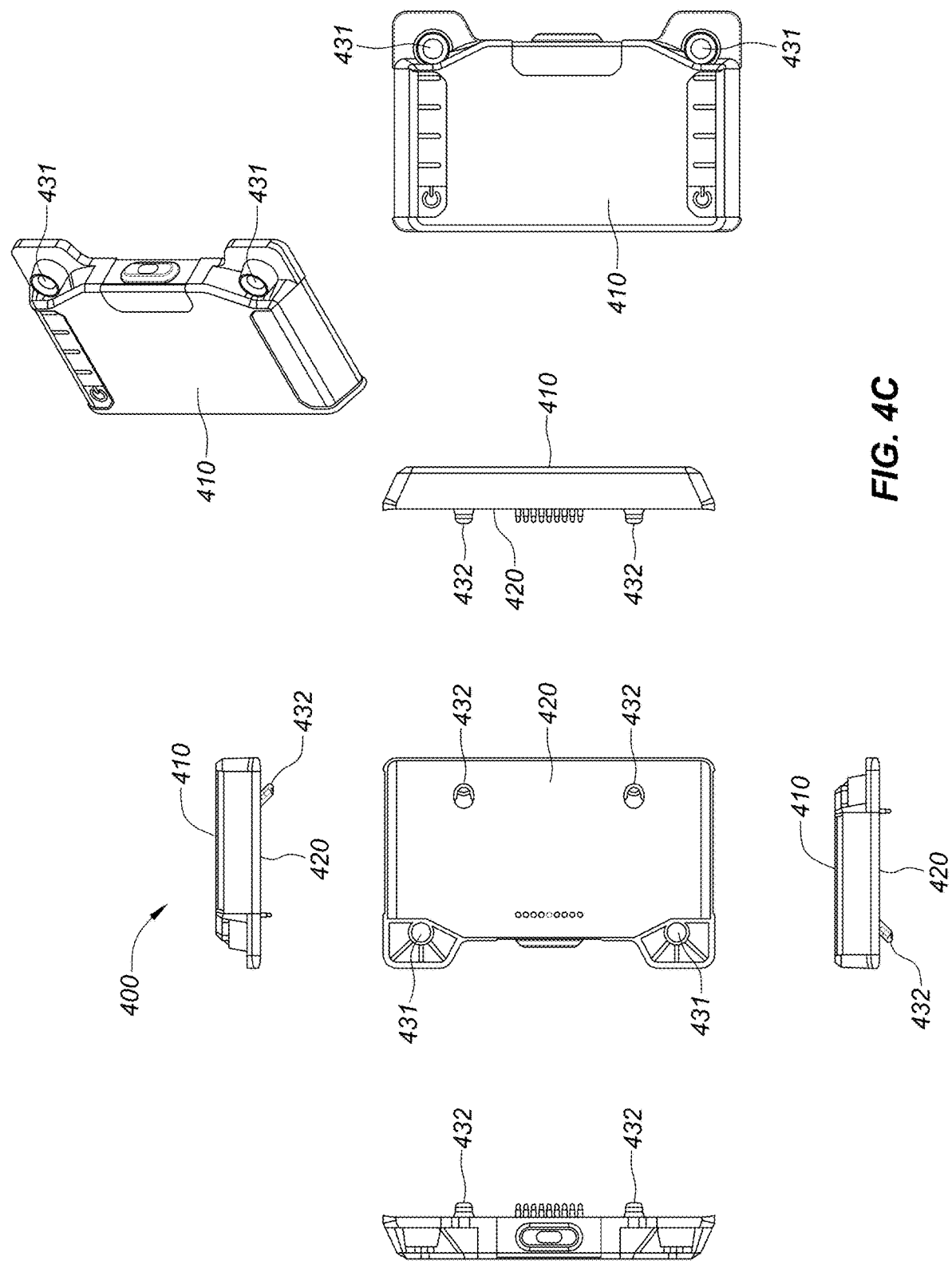
FIG. 4C is a compilation of various perspective, side, and plan views of the assembled battery bank of FIGS. 4A-4B.

FIGS. 4A-4C depict an implementation of the battery bank accessory 400, which when mounted to the speaker 100 can provide power to the speaker or recharge the speaker battery when the speaker is running low on power. The battery bank 400 can be charged via a micro USB charging port. Specifically, FIG. 4A is a front top side perspective view of the speaker unit 100 with the cover plate 230 (illustrated in FIG. 1A2) removed and the battery bank accessory 400 mounted thereto. FIG. 4B is an exploded view of the battery bank accessory 400 of FIG. 4A illustrating the various components thereof including a two part housing comprised of top and bottom housing covers 410 and 420 configured with rear screw holes 431 and screws 229 adapted to being passed through the battery bank holes 431 and holes 228 in the top sleeve 220 of the speaker 100 and threaded into threaded screw anchor 227 at the rear of the housing 170 to secure the accessory to the speaker 100. The bottom housing cover 420 also includes front positioned hooks 432 that hook into holes 228 in the top sleeve 220 toward the front face or side to further secure the accessory to the speaker. The hooks 432 are configured to catch on the perimeter region of the holes 228 of the sleeve 220 so that the end section of the hook resides within the separation or space between the sleeve 220 and the underlying housing 170.

When the two covers 410, 420 are mated together they form a cavity that houses one or more rechargeable batteries 440, a printed circuit board assembly ("PCBA") 450 that controls the charging and discharging of the battery 440, and an interface connector 460 that extends from the interfacing side of the bottom cover 420 and is adapted to interface with the corresponding connector 301 on the top of the speaker 100. The interface connector 460 includes a micro USB connector or port 470 that provides a discrete charging port to charge the rechargeable battery(ies) 440 contained within the battery bank housing 410, 420. A foam component or pad 480 (which can be in the form of a sticker or have adhesive layer) is mounted to the battery 440 so that when the battery bank 400 is assembled it resides between the battery 440 and the internal surface of bottom cover 420 of the battery bank housing to provide additional insulation and protection/cushioning to the battery. Additional cushioning pads can be positioned on one or more or all of the sides of the battery 440. FIG. 4C provides a compilation of various perspective, side, and plan views of the assembled battery bank of FIGS. 4A-4B.

In operation, the battery bank 400 is attached or mounted to the top of the base speaker 100 unit via the mechanical and electrical interfaces (e.g., hooks 432, screws/screw holes 229/431, and connector 460), and electrical energy stored in the rechargeable battery 440 is transmitted to the speaker unit 100 through the electrical interface 460 so that the battery bank accessory 400 can power the functionalities of the speaker 100 or recharge the speaker battery. When the battery 440 is drained, the battery bank may be recharged using a charging cable that connects to the discrete USB charging port 470 on the bank.

Figure 5A:
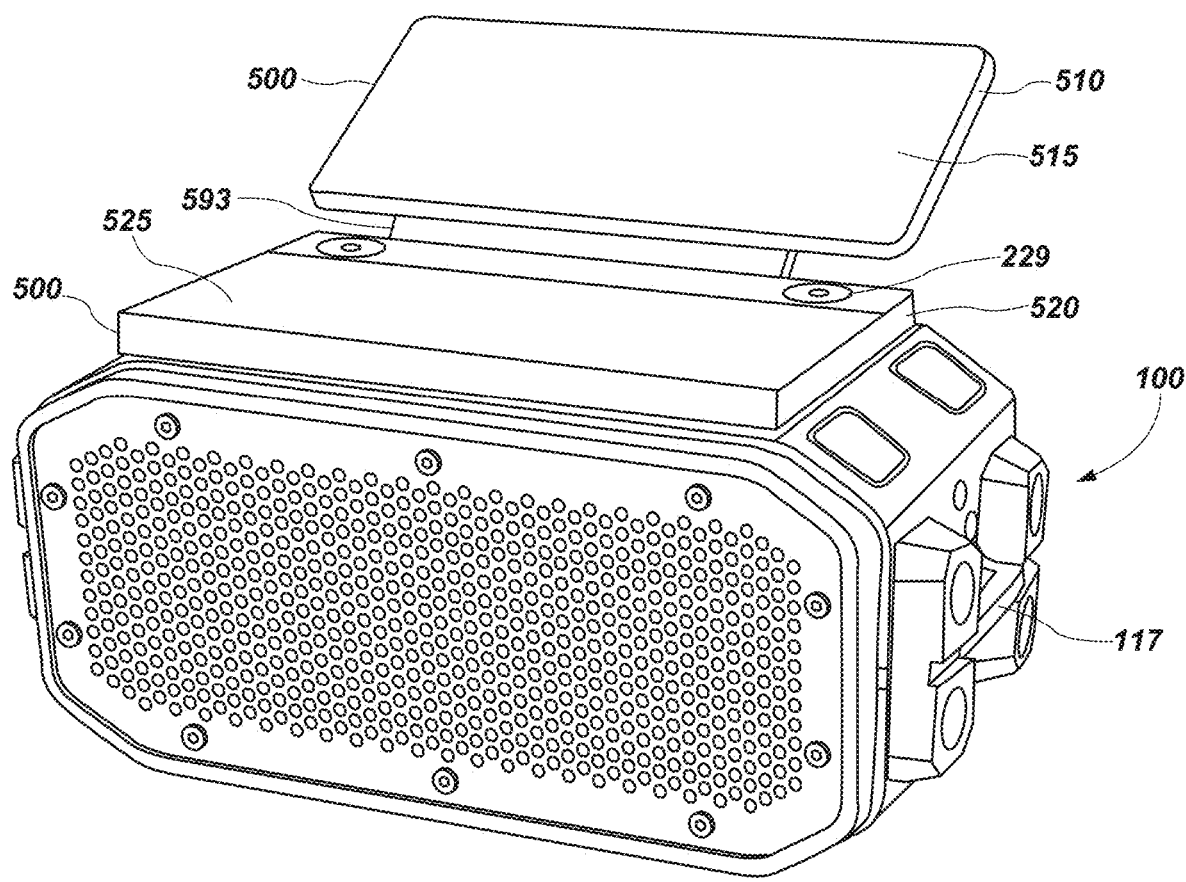
FIG. 5A is a front top side perspective view of the speaker unit of FIG. 1A1 with the cover plate removed and an unfolded two panel solar panel accessory 500 mounted thereto.
Figure 5B:
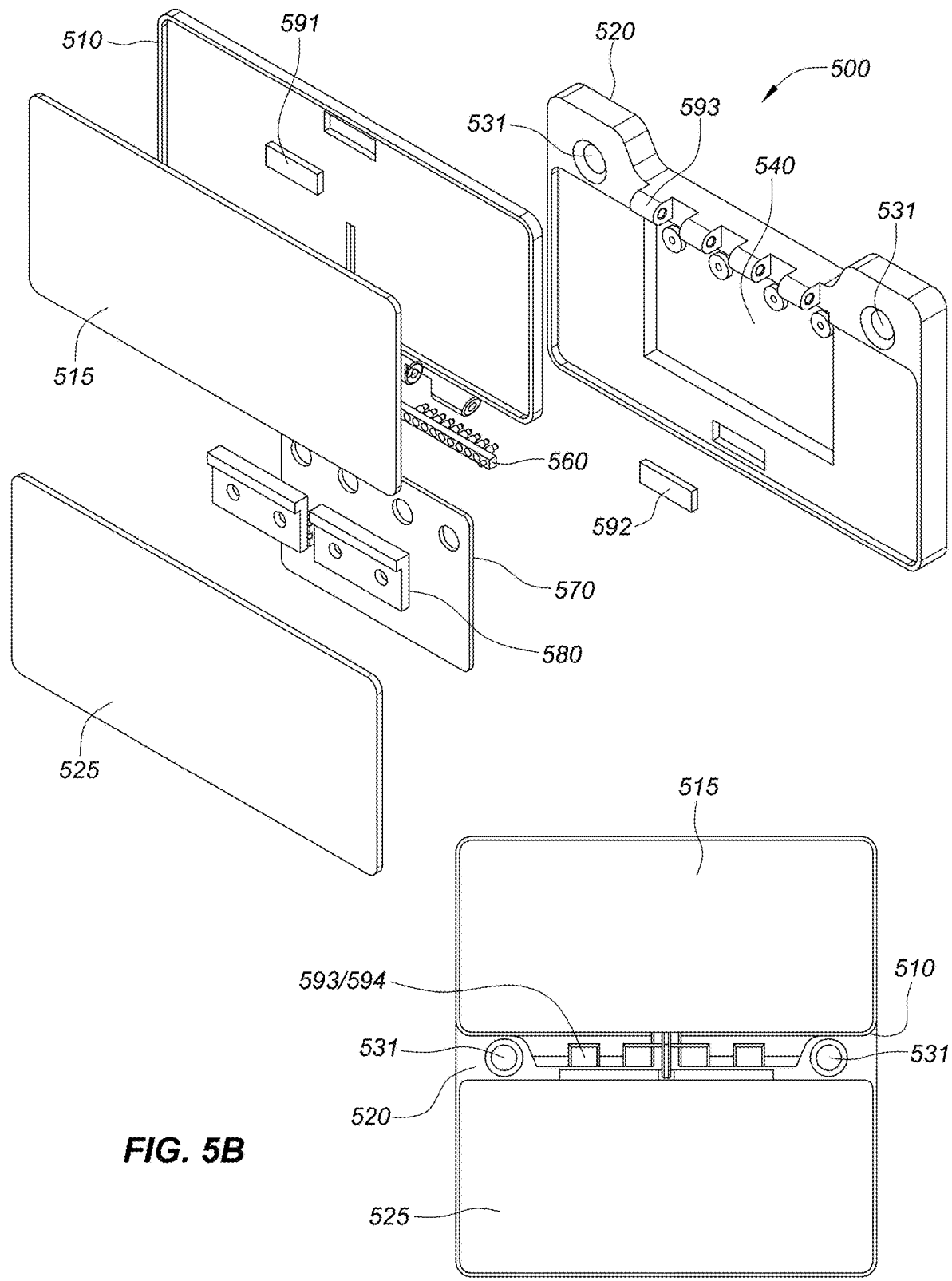
FIG. 5B is an exploded view of the two panel solar panel accessory depicted in FIG. 5A illustrating the various components thereof.
Figure 5C:
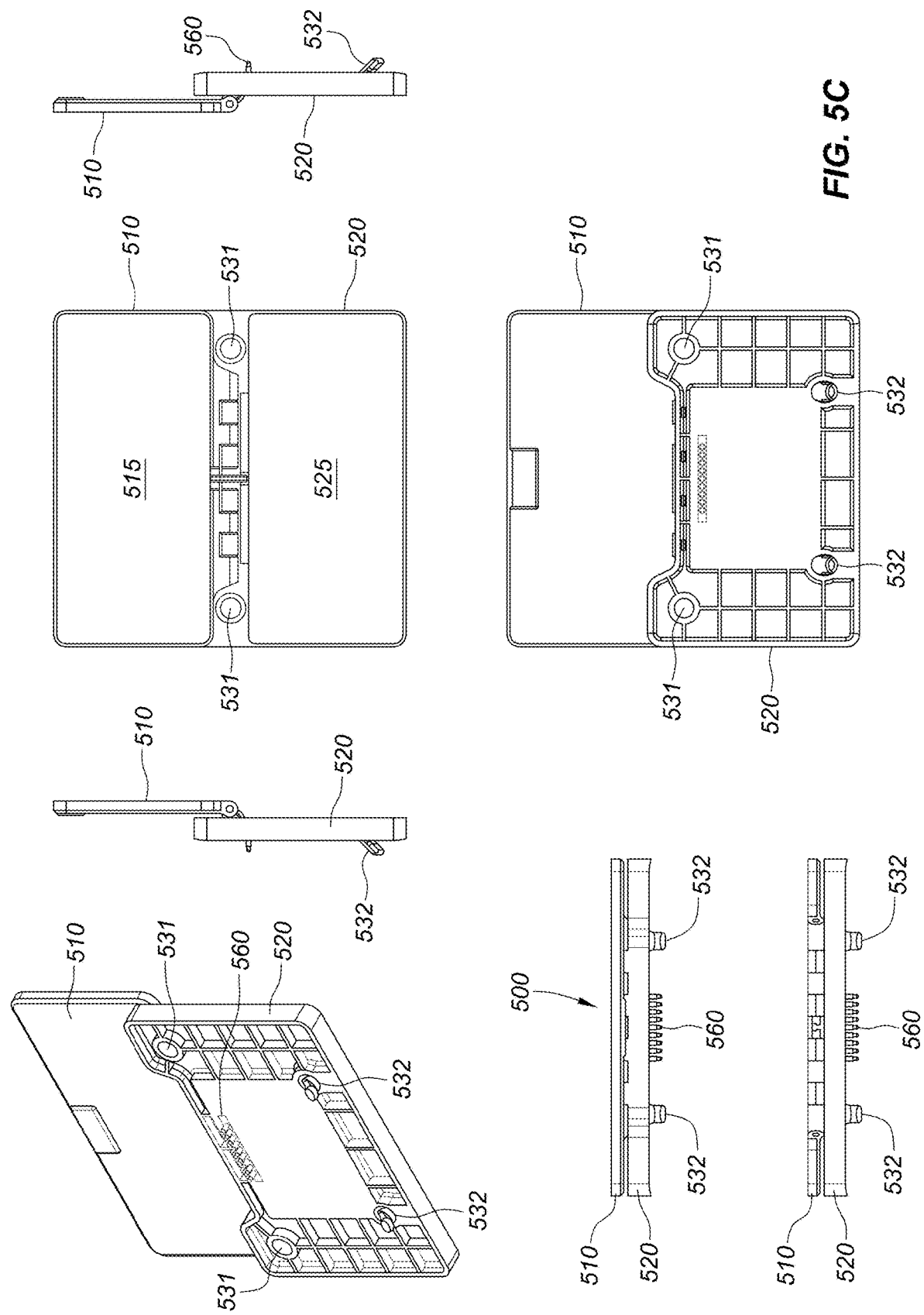
FIG. 5C is a compilation of various perspective, side, and plan views of the assembled solar panel accessory of FIGS. 5A-5B in a fully open unfolded configuration.

FIGS. 5A-5C depict an implementation of a solar panel accessory 500, which when mounted to the speaker 100 can provide power to the speaker or recharge the speaker battery when the speaker is running low on power. More specifically, FIG. 5A is a front top side perspective view of the speaker unit 100 with the cover plate 230 (illustrated in FIG. 1A2) removed and the solar panel accessory 500 unfolded. FIG. 5B is an exploded view of the two panel solar panel accessory 500 illustrating the various components including top and bottom cabinet panels 510, 520 configured with rear screws holes 531 and mounting screws 229 adapted/dimensioned to being passed through holes 521 in the solar panel and holes 228 in the top sleeve 220 of the speaker 100 and threaded into threaded screw anchor 227 at the rear of the housing 170 to secure the accessory to the speaker 100. The bottom cabinet panel 520 also includes front positioned hooks 532 that are configured to be inserted into holes 228 in the top sleeve 220 toward the front face or side to further secure the accessory to the speaker. The hooks 532 are configured to catch on the perimeter region of the holes 228 of the sleeve 220 so that the end section of the hook resides within the separation or space between the sleeve 220 and the underlying housing 170.

The top cabinet panel 510 supports the top solar panel 515 and the bottom cabinet panel 520 supports the bottom solar panel 525 and also includes a connector 560 that extends from the back side of the bottom panel 520 and is adapted to interface with the corresponding connector 301 on the top of the speaker 100 when mounted thereto. The bottom cabinet panel also includes a cavity 540 that houses a printed circuit board assembly 570 that is electrically connected to the solar panels 515, 525 and controls the current generated from the solar panels. Plastic inserts 580 are used to secure or hold the PCBA 570 in the cavity 540. A pair of opposing magnets 591, 592 on facing sides of the top and bottom cabinet panels 510, 520 can serve to magnetically secure the top and bottom panels 510, 520 to one another so as to maintain the panels in the closed position when the accessory is not being used. FIG. 5C is a compilation of various perspective, side, and plan views of the assembled solar panel accessory in a fully open unfolded configuration.

In operation, the solar panel 500 is attached to the base speaker 100 unit via the mechanical and electrical interfaces (e.g., hooks 532, screws/screw holes 229/531, and connector 560). The top solar panel 510 is unfolded into the open position as illustrated in FIGS. 5A-5C. Solar energy captured by the solar panels 515, 525 is converted to electrical energy and transmitted to the speaker unit 100 through the 9-pin electrical interface 560 with the speaker and thereby provides power to the speaker to support the functionalities of the speaker and/or to recharge the speaker battery. Thus when mounted to the speaker 100, the solar panel accessory 500 can generate electrical power from the sun then the two panels can fold into a fully closed position to protect the panels when not in use. Magnet latches 591 and 592 can keep the panels 515, 525 closed when not in use. To facilitate folding, the panels are hinged 593 to one another at one edge region using hinge pins 594.

Figure 6A:
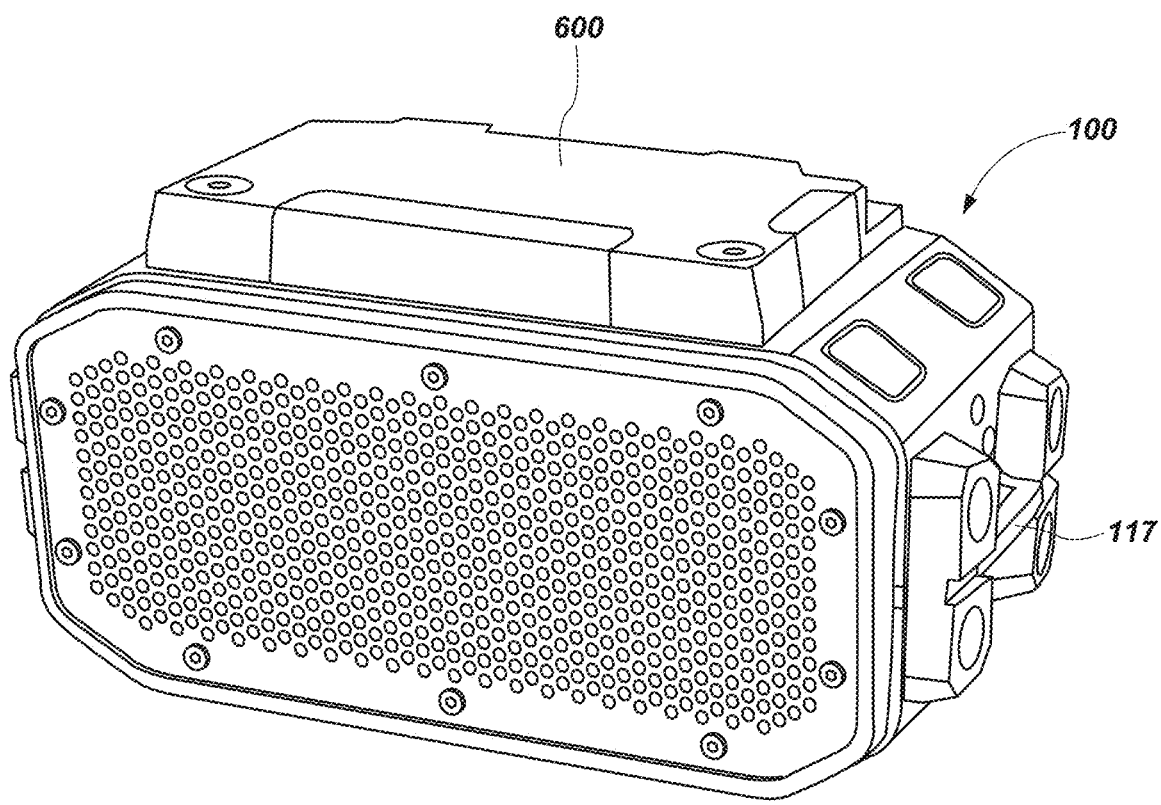
FIG. 6A is a front top side perspective view of the speaker unit of FIG. 1A1 with the cover plate removed and a wireless charging pad accessory 600 mounted thereto.
Figure 6B:
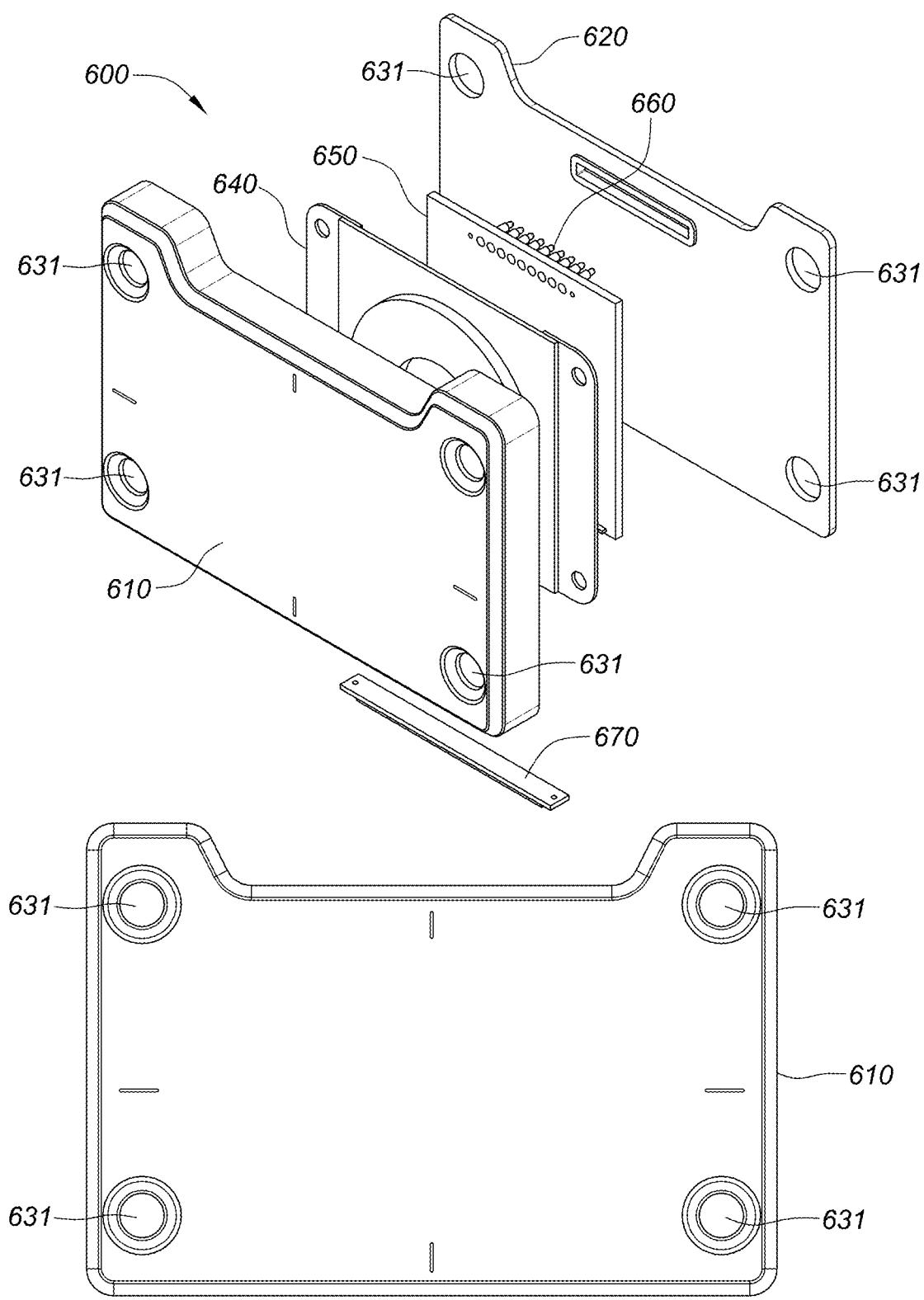
FIG. 6B is an exploded view of the wireless charging pad accessory of FIG. 6A illustrating the various components thereof.

FIGS. 6A-6C depict an implementation of a wireless charging pad accessory 600, which, when mounted to and powered by the speaker 100, can wirelessly charge an external device. Specifically, FIG. 6A is a front top side perspective view of the speaker unit of FIG. 1A1 with the cover plate removed and a wireless charging pad accessory 600 mounted thereto. FIG. 6B is an exploded view of the wireless charging pad accessory of FIG. 6A illustrating the various components including a two part housing comprised of top and bottom cabinet panels 610 and 620 that when assembled form a cavity that houses a Qi wireless charging assembly 640 and a PCBA 650 to control the operation of the charging assembly 640 and facilitate connection to the speaker's internal battery via the electrical interface connection 660 that is mounted to the PCBA 650 and extends through the bottom cabinet panel 620 when the accessory is assembled.

While a Qi wireless assembly 640 is employed, it should be understood that other wireless charging systems and standards may be employed such as those developed by Power Matters Alliance™ (PMA) and the Alliance for Wireless Power® (A4WP). The cabinet panels 610, 620 have pass through screw holes 631 at each corner to allow screws 229 adapted to be screwed through corresponding holes 228 in the top sleeve 220 of the speaker 100 and threaded into a threaded screw anchor 227 formed in the speaker housing 170.

An LED light pipe housed in clear plastic 670 is mounted to the outside of the charging pad accessory 600 and connected to the PCBA 640 to provide the user with a visible means to monitor charging status. For example, the light pipe may emit blue light when it is charging, red light when there is a charging error or problem, and another color light or no light when the accessory is not charging an external device. The light pipe may also emit another color like green when it is ready to charge an external device. FIG. 6C is a compilation of various perspective, side, and plan views of the assembled wireless charging pad 600.

In operation, the wireless charging pad 600 is attached to the base speaker unit 100 via the mechanical and electrical interfaces (e.g., screws/screw holes 229/631 and connector 660). Once connected battery power from the base speaker 100 unit is provide to the wireless charging pad 600 to facilitate inductive or wireless charging of a mobile device having a compatible wireless charging capability.

Figure 7A:
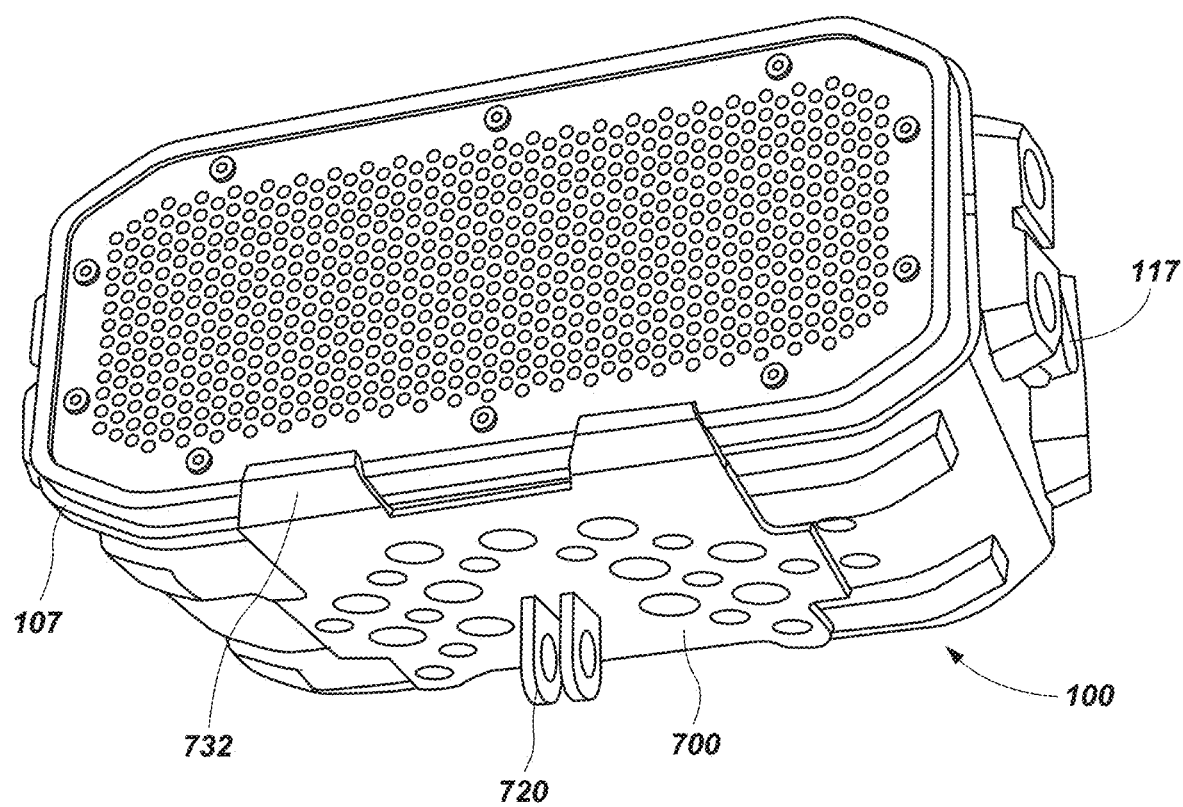
FIG. 7A is a front bottom side perspective view of the speaker unit of FIG. 1A1 with an action mount accessory 700 mounted or attached to the bottom side of the speaker. The particular mount is adapted to being attached to mounts marketed under the GoPro capture device line. Other mount types may be employed.
Figure 7B:
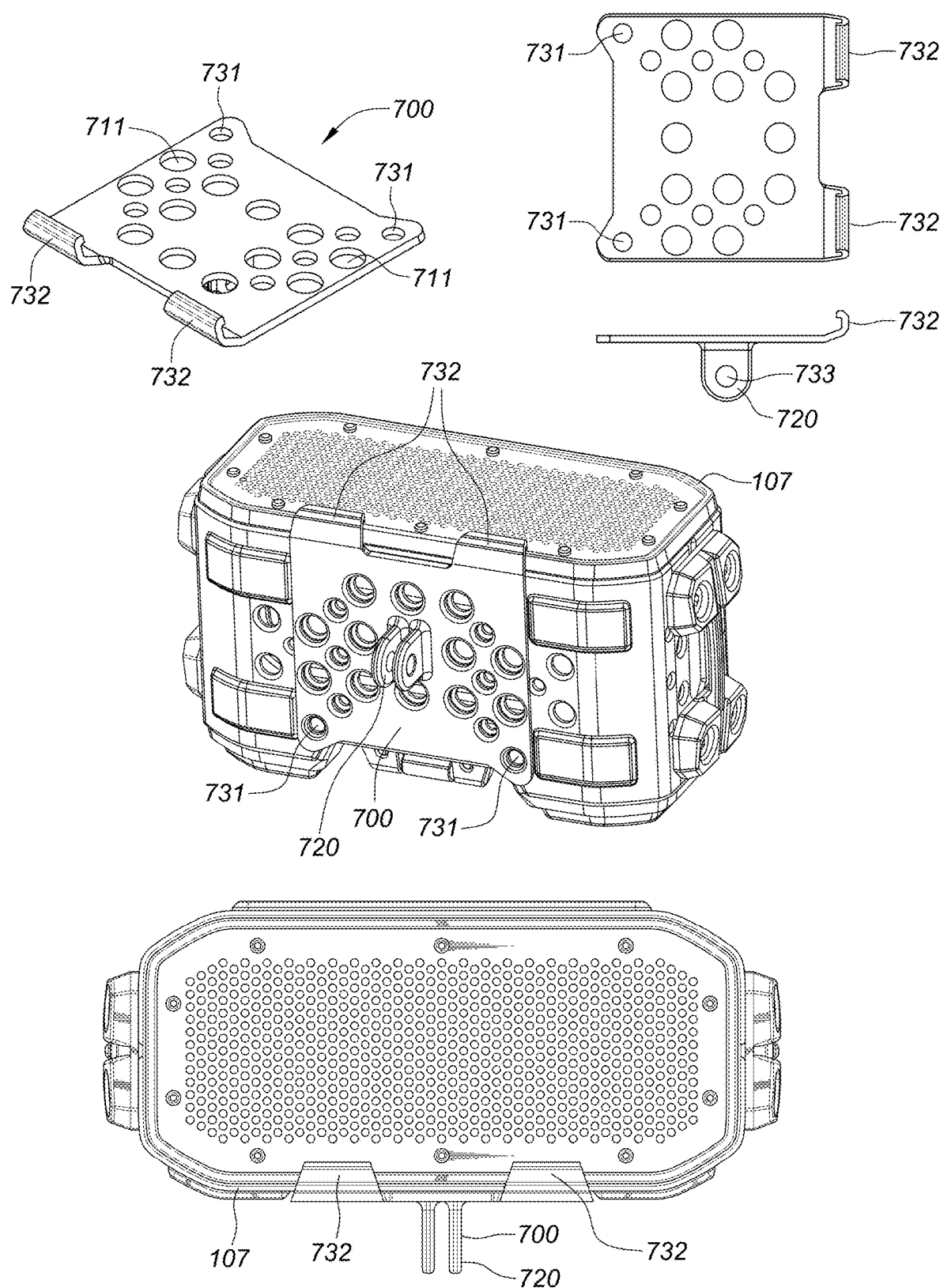
FIG. 7B shows perspective, plan, and side views of the action mount accessory of FIG. 7A alone and additional perspective and front face views of the stereo speaker base unit with the action mount accessory attached to the underside thereof.
Figure 7C:
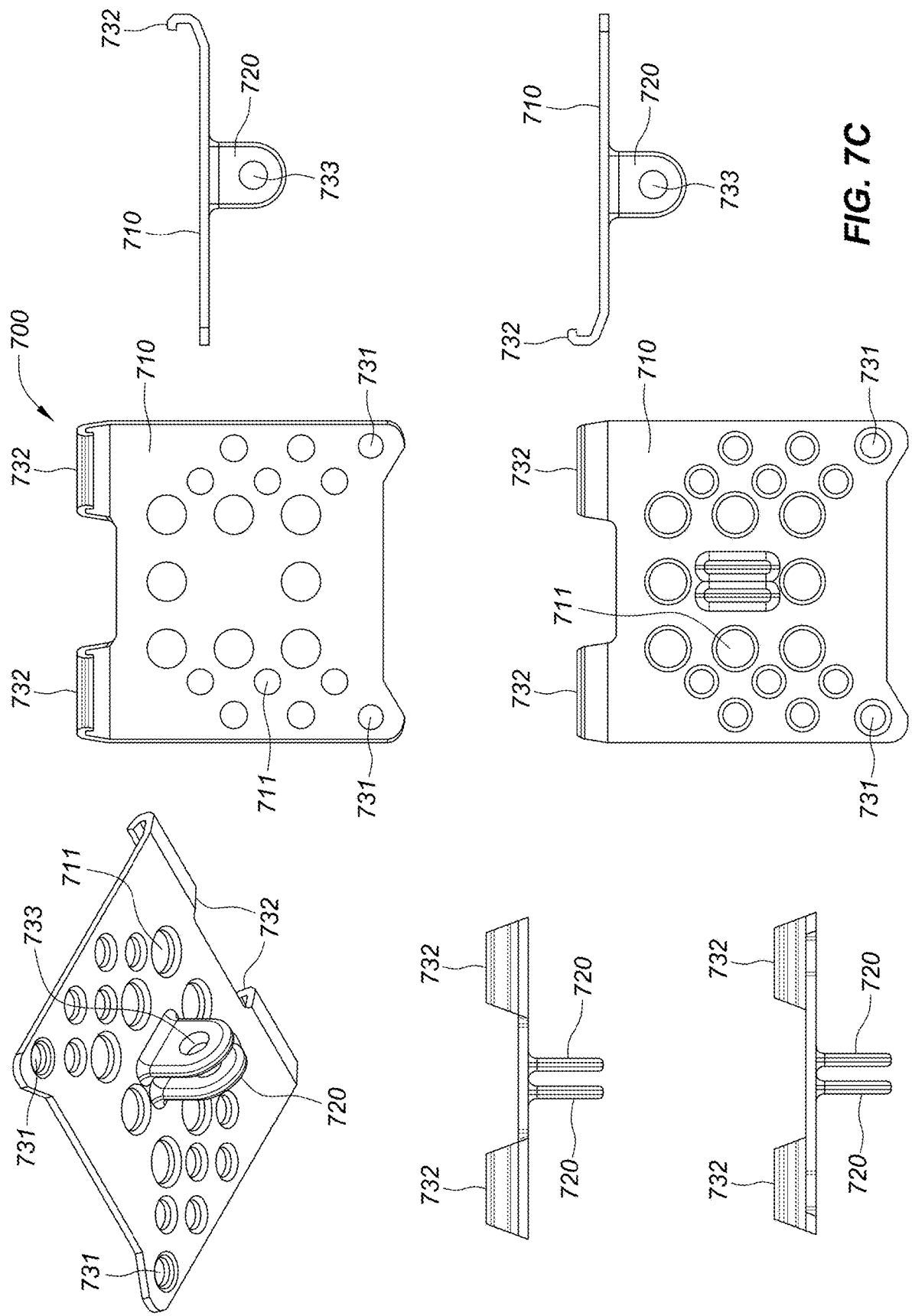
FIG. 7C is a compilation of various perspective and plan views of the action mount accessory of FIGS. 7A-7B.

FIGS. 7A-7C depict an implementation of an action mount accessory 700, which when mounted to the bottom side of the speaker 100 provides a mounting attachment that can be connected to a corresponding attachment mounted to other structures. Specifically, FIG. 7A is a front bottom side perspective view of the speaker unit 100 with an action mount accessory 700 adapted to being attached to mounts marketed under the GoPro capture device line. Other mount types may be employed. FIG. 7B shows perspective, plan, and side views of the action mount accessory 700 alone and additional perspective and front face views of the stereo speaker base unit 100 with the action mount accessory 700 attached to the underside thereof. As illustrated in those drawings, the accessory includes a panel 710 that includes holes 711 that correspond in size and location with the holes 248 in the bottom sleeve 240. The front side end of the panel 710 extends to form hooks 732 that are adapted to latching or hooking over the lip protrusion 107 that extends from the housing 170 on the front face of the speaker 100. The outer surface of the panel 710 includes an outwardly extending mounting connection 720 that includes action mount holes 733 that are adapted to being mounted to a corresponding GoPro mount. The action mount 700 may be made of aluminum or other suitable metal or material. FIG. 7C is a compilation of various perspective, side, and plan views of the action mount accessory 700.

In operation, the action mount 700 is hooked over the perimeter lip 107 on the front face of the speaker 100 and hinged over the bottom sleeve 240 so that the holes 248 on the bottom sleeve 240 are aligned with the holes 711 on the mount plate or panel 710. Screws 229 passed through corresponding holes 731 in the action mount 700 and the bottom sleeve 230 and are screwed therein and/or threaded into a threaded screw anchor 247 (not shown) formed in the bottom side of the speaker housing 170 to thereby secure the action mount 700 to the bottom of the speaker unit 100. The hooks 732 on the action mount 700 are configured to catch over the perimeter lip or protrusion 107 extending on the front face of the speaker housing 170. Once fully secured, the speaker 100 can be mounted to another object using the outwardly extending mounting connection 720 and action mount holes 733 on the action mount. Alignment of the holes on the bottom sleeve 230 and those holes 711 on the base plate panel 710 are useful in facilitating proper alignment and allowing audio sound to emanate from the passive radiator 176.

Figure 8A:
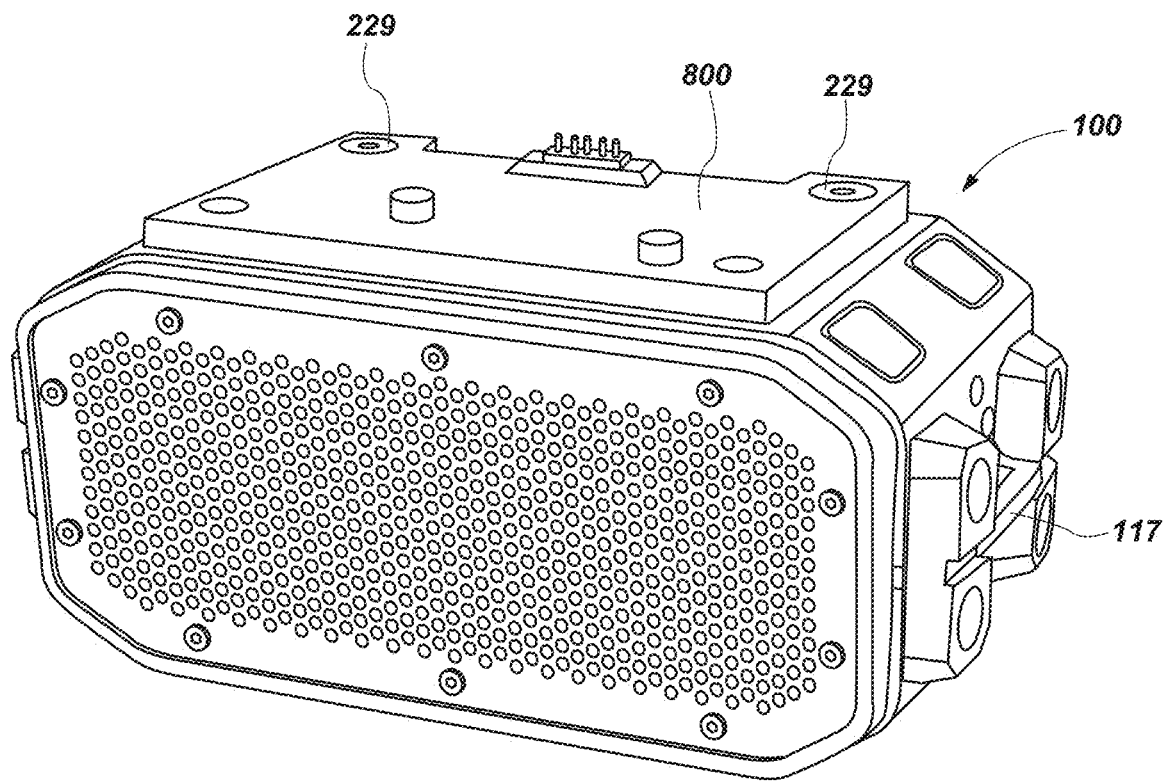
FIG. 8A is a front top side perspective view of the stereo speaker main unit of FIG. 1A1 with the cover plate removed and a stack plate accessory 800 mounted to the top of the speaker. The stack plate is secured with threaded screws as previously described in connection with other accessories.
Figure 8B:
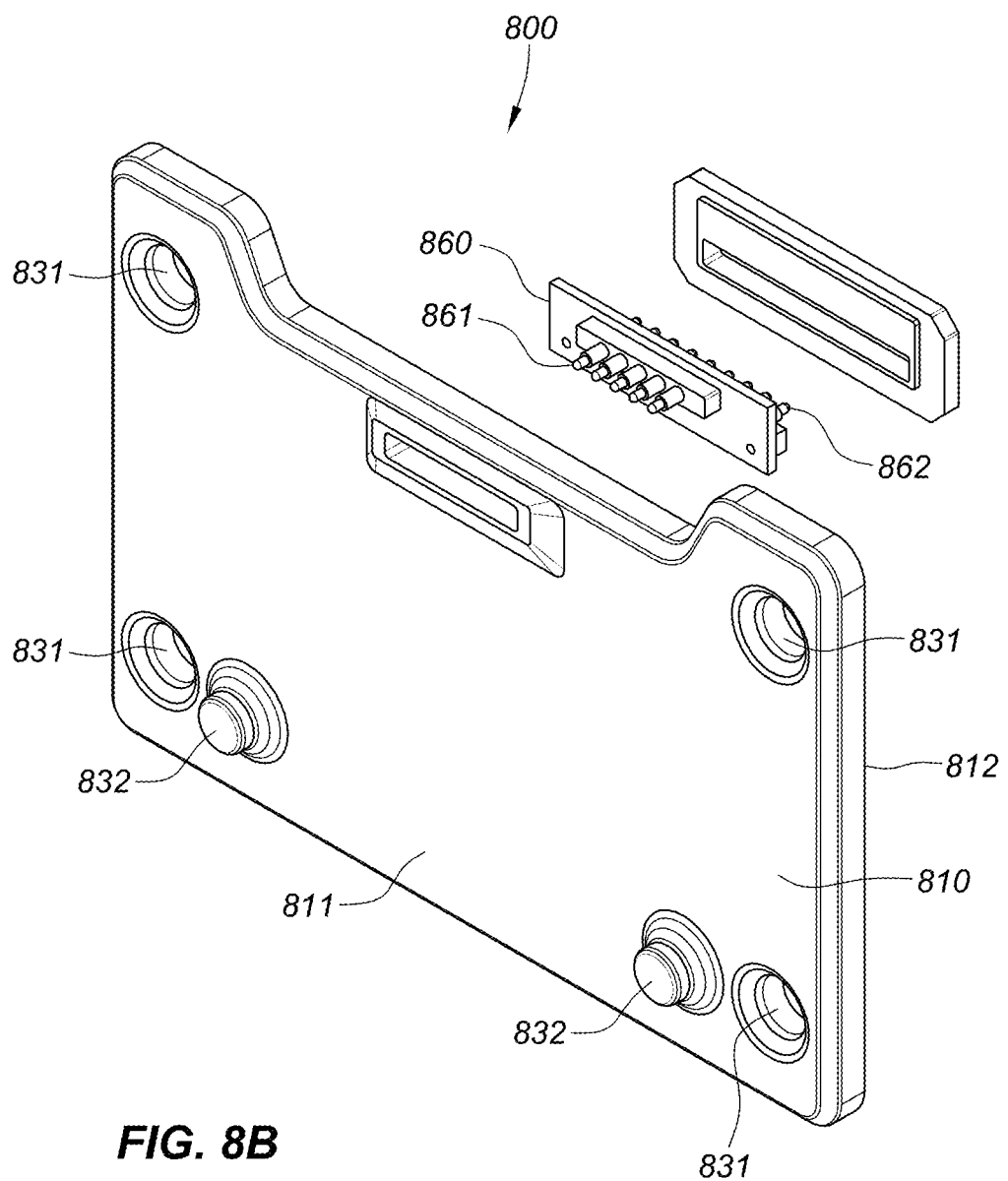
FIG. 8B is an exploded view of the stack plate of FIG. 8A illustrating the various components thereof.
Figure 8C:
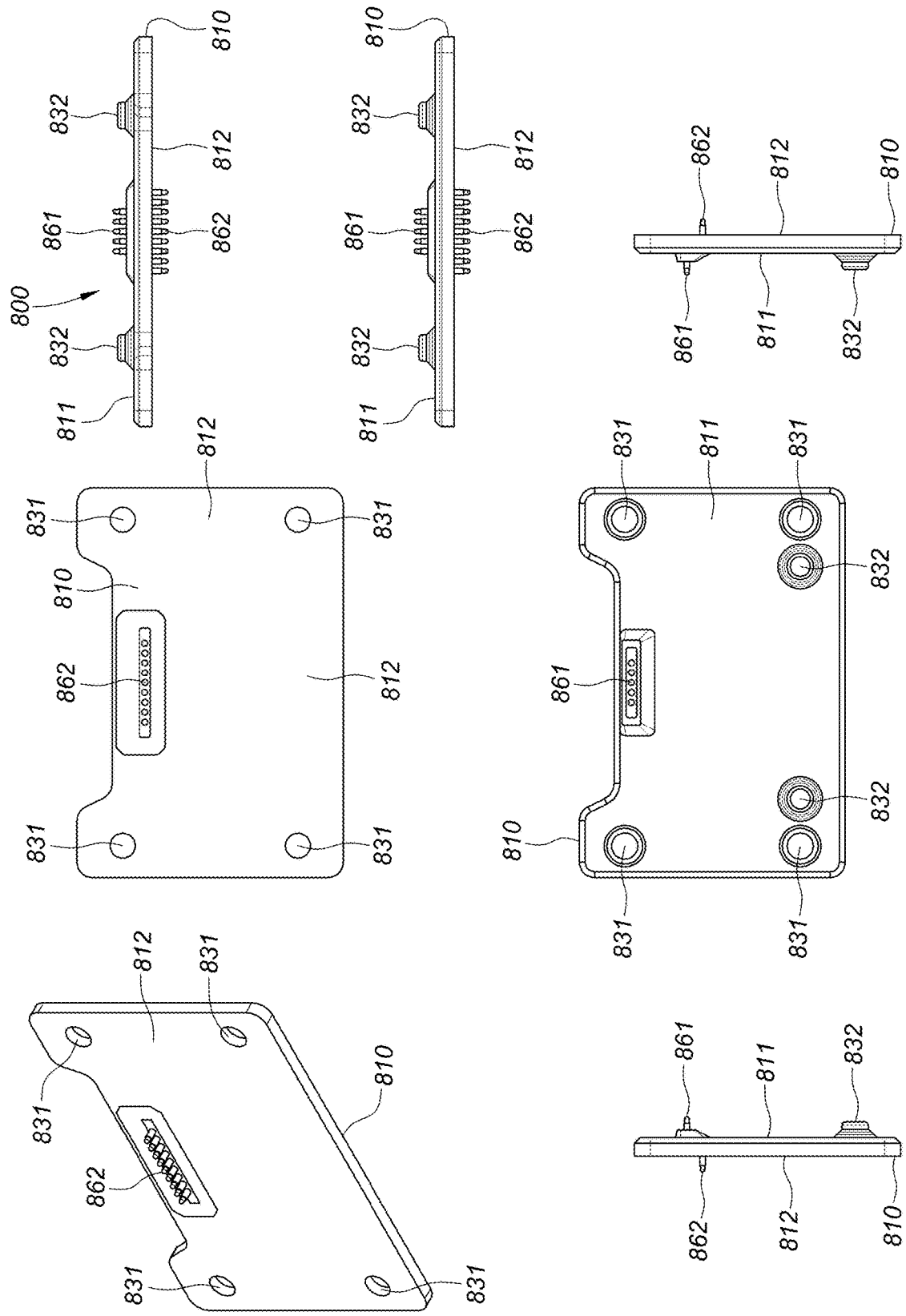
FIG. 8C is a compilation of various perspective, side, and plan views of the stack plate of FIGS. 8A-8B.

FIGS. 8A-8C depict an implementation of a stacking plate accessory 800, which when mounted between two speakers 100 provides allows for audio from the top speaker to be plated to the bottom speaker. Specifically, FIG. 8A is a front top side perspective view of the stereo speaker main unit 100 with the cover plate 230 removed and a stack plate accessory 800 mounted to the top of the speaker 100. The stack plate 800 is secured with screws 229 that pass through holes 831 in the corners of the accessory 800 and corresponding holes 228 in the sleeve and threaded into the screw anchors 227 as previously described in connection with other accessories.

FIG. 8B is an exploded view of the stack plate of FIG. 8A. As illustrated therein the stack plate includes a plastic main body or support panel 810 having an upper and lower face 811, 812 that supports a stacking pin PCBA 860 that has a 5 male pin output 861 extending from the upper face 811 of the support panel 810 and 9 male pin input 862 extending in an opposing direction from the bottom or lower face 812 of the support panel 810. The 9 male pin input 862 connector is adapted to interface with the 9-pin female electrical connector 301 on the top of the speaker 100. The 5 male pin output connector 861 is adapted to interface with the 5-pin female connector 307 on the bottom of a primary speaker 100 that is stacked on-top of a secondary speaker. The functionality of each of the pins are described in connection with FIGS. 1C and 3A-3B. FIG. 8C is a compilation of various perspective, side, and plan views of the stack plate 800.

Once mounted, the stack plate 800 basically operates to connect the audio related lines (i.e, right CH, GND, left CH and detect audio) of the 5-pin output connector 307 with the corresponding audio related lines of the 9-pin connector 301 on the top side of the base unit 100 so that audio signals can be transmitted to the secondary speaker mounted and underneath the primary speaker and connected thereto via the stack plate 800. Protrusions 832 on the outer surface of the stack plate 800 are configured to be positioned for insertion into holes 248 of the bottom sleeve 240 of the primary speaker unit stacked on top of the stack plate 800 so as to provide stability to the speaker stack. The protrusions 832 are preferably dimensioned to correspond in dimension with the inner diameter of the corresponding sleeve holes 248 in which they are configured to be received so as to provide a mechanical interlock between the two stacked speakers.

Figure 8D:
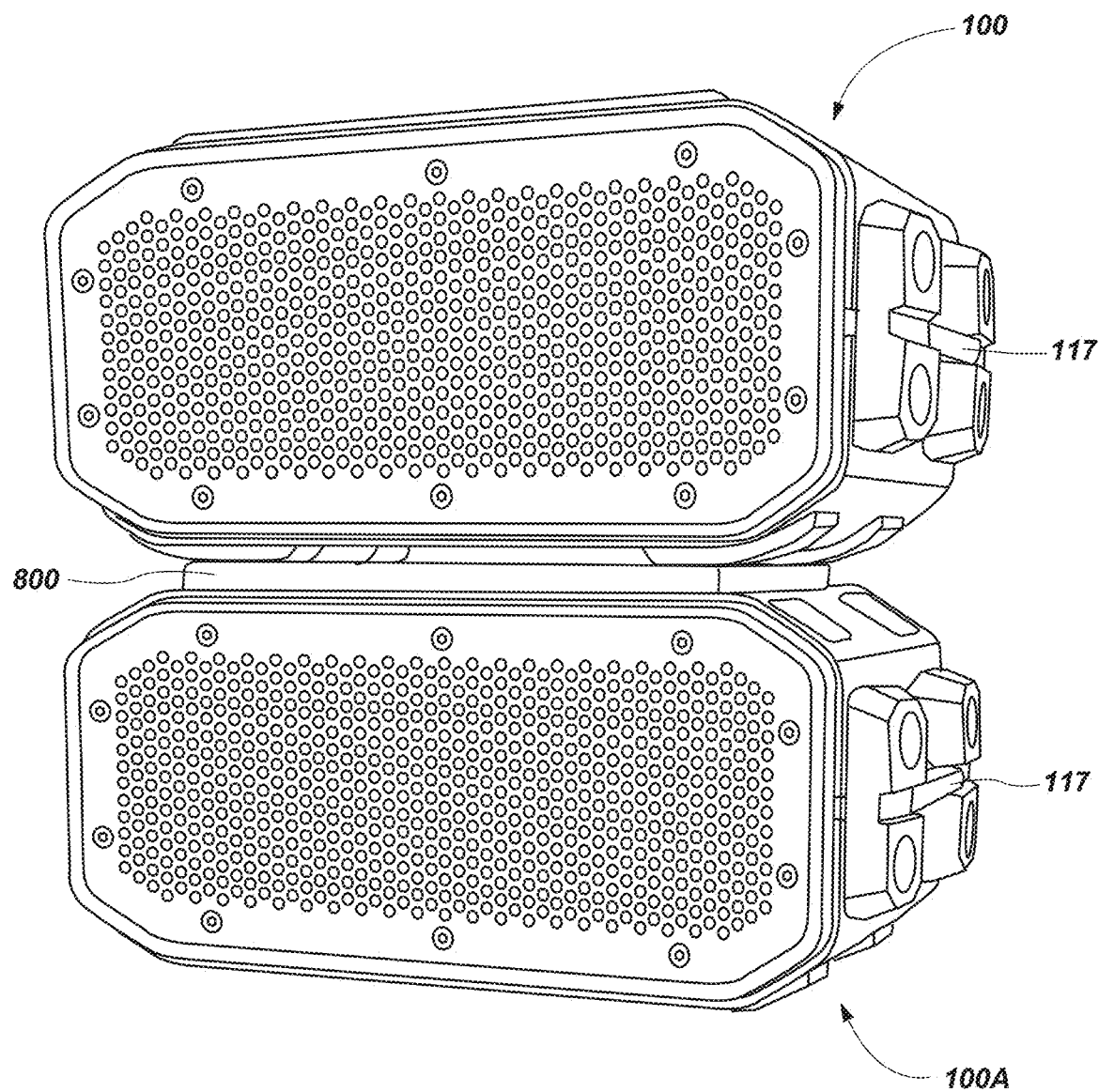
FIG. 8D shows a perspective view of a first or primary stereo speaker base unit, such as that illustrated in FIG. 1A1, and a secondary stereo speaker base unit (also like that illustrated in FIG. 1A1) stacked one on top of the other with the primary speaker on top and mounted thereto via the stack plate illustrated in FIGS. 8A-8C.

FIG. 8D shows a perspective view of a first or primary stereo speaker base unit 100 stacked on top of a secondary stereo speaker base unit 100A and mounted thereto via the stack plate 800 illustrated in FIGS. 8A-8C. In operation, audio from the primary speaker 100 is communicated through the 5-pin to 9-pin connector (861 and 862) mounted through the stacking plate 800 to the secondary speaker 100A. More particularly and with reference to the circuit block diagram in FIG. 3, the audio stack plate 800 connects the top of a slave unit 100A to the bottom of a master unit 100 in order to pass audio signals from the master speaker 100 to one or more speakers that are placed under the master unit. The 5-pin connector on the bottom only transmits audio signals.

While the audio signals from the top speaker 100 are shared with the bottom speaker 100A, each speaker is independently powered. Like a wired daisy chain, multiple speakers can be stacked one on top of the other using multiple stacking plate accessories 800 and audio can be directly shared to each of the underlying speakers through the audio pass through 5-pin to 9-pin connector (861 and 862) on the interfacing stack plate 800 positioned between each set of speakers. The stack plate accessory 800 serves also to bridge the gap between the connector contacts on the top and bottom speakers.

Modification of the stack plate accessories may include a first 9-pin connector on the top side and a second 9-pin connector on the bottom side, and the power lines (i.e. 5VOUT, ground, 5VVIN, detect accessory, and TX/RX (transmit/receive) line) to connect between base speakers 100 and any other accessories such as the power bank 1000, described in more detail below. The stack plate may also be modified to facilitate transmitting both power and audio, in which case both the audio related and power related lines of the 9-pin connector would be used.

Figure 8E:
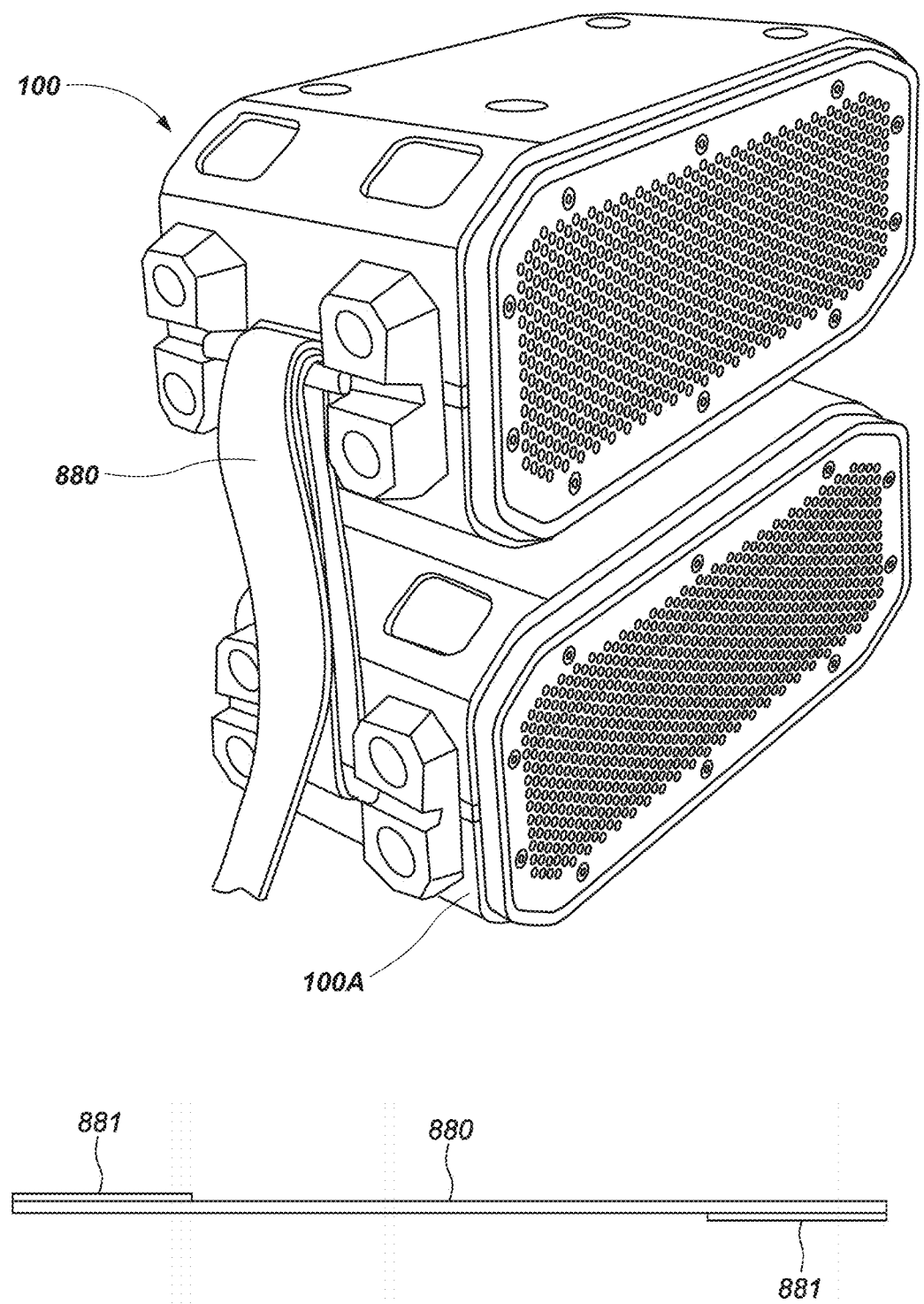
FIG. 8E shows the use of Velcro® hook-and-loop fastener covered straps to keep or hold the stacked speakers together and allow them to be securely moved as a unit while in operationally functional stacked configuration. The straps are dimensioned to be inserted into side loops that are mounted to the opposing sides of the speaker housing.

FIG. 8E shows the use of hook-and-loop fasteners 881 (e.g., those sold under the Velcro® brand) covered straps 880 to keep or hold the stacked speakers together and allow them to be securely moved as a unit while in the functional stacked configuration. The straps 880 are dimensioned to be inserted into side hooks or loops 117 that are mounted to the opposing sides of the speaker housing. The straps 880 are also configured so that the strap can pass through loop 117 on right side 110, over or under speaker 100, through loop 117 on left side 112, and around a handlebar or other anchor before the hooks on one end fasten to the loops on the other end of the strap to secure the speaker in position. Other straps or mechanical attachment mechanisms like hooks, latches or other straps may also be used to attach or secure stacked speakers or accessories to one another.

Figure 9A:
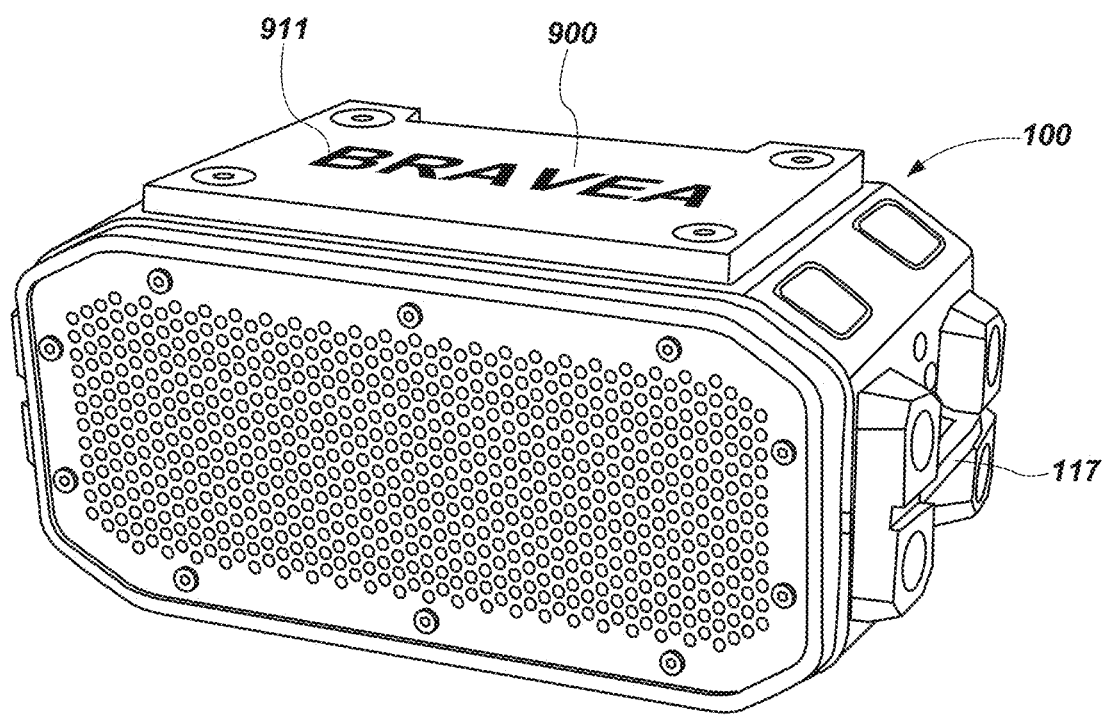
FIG. 9A is a front top side perspective view of the speaker unit of FIG. 1A1 with the cover plate removed and a glow deck lamp accessory 900 mounted thereto. The glow deck lamp accessory is configured to be capable of providing diffused light.
Figure 9B:
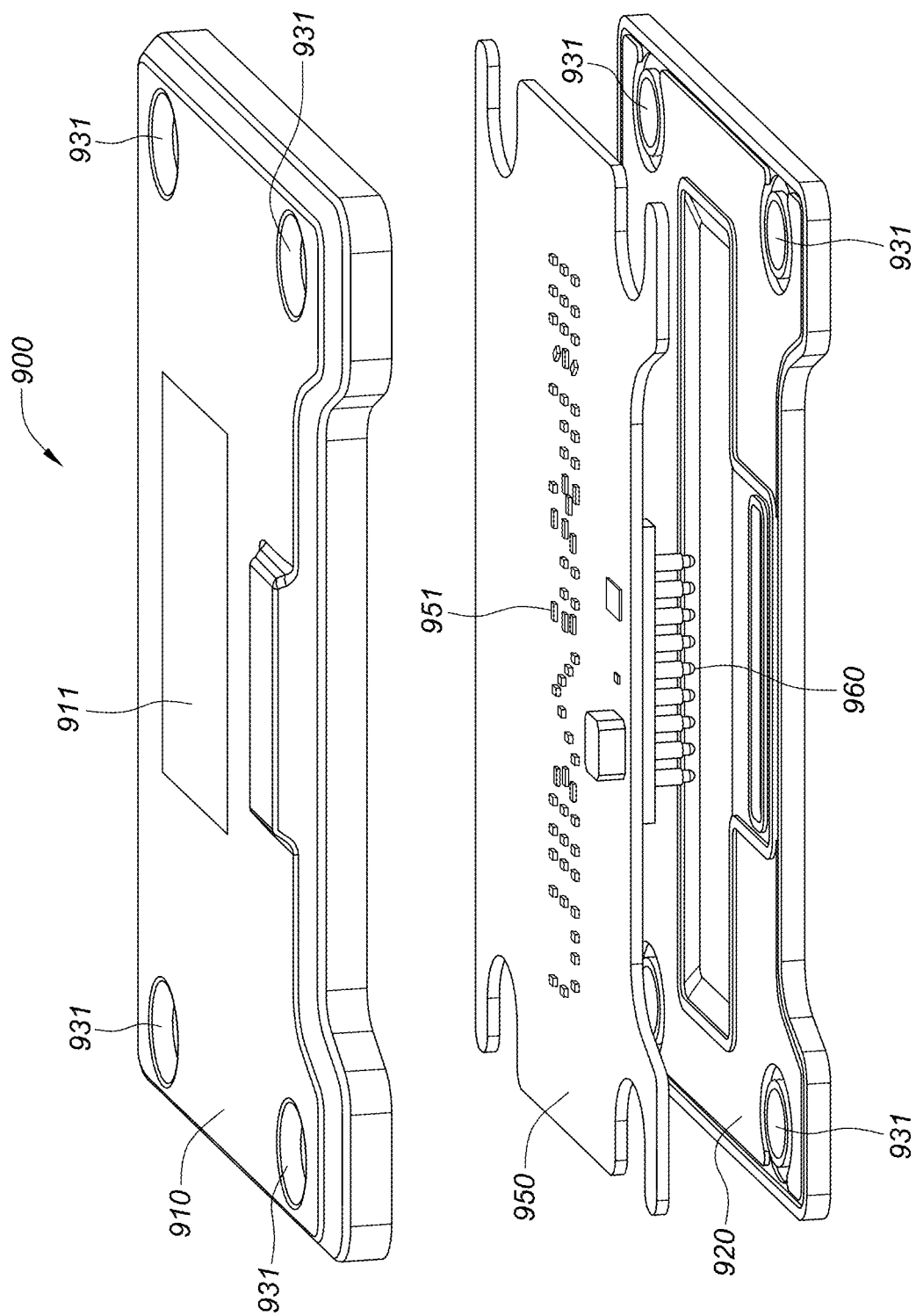
FIG. 9B is an exploded view of the glow deck lamp accessory of FIG. 9A illustrating the various components thereof.

FIGS. 9A-9C depict an implementation of a glow deck lamp accessory 900, which when mounted to and powered by the speaker 100 can provide light in a diffused illuminating glow. Specifically, FIG. 9A is a front top side perspective view of the speaker unit 100 with the cover plate 230 removed and a glow deck lamp accessory 900 mounted thereto. FIG. 9B is an exploded view of the glow deck lamp accessory 900 illustrating the various components including a two part housing comprised of top semi-opaque white plastic cover 910 and a black matte plastic bottom cover 920 that when assembled together form a cavity that houses a PCBA 950 populated with Light Emitting Diodes (LEDs) 951, which when powered by the speaker unit 100, emit light that illuminates the semi-opaque top cover 910 so as to be visible by the user. Any color LEDs 951 may be employed including but not limited to white, red, blue, yellow and green or any combination thereof. The LEDs 951 may be uniformly positioned under the top cover plate or aggregated in discrete locations or patterns, for example to conform with or outline a logo 911. Screws 229 adapted to being passed through holes in the top and bottom covers 910, 920 are passed through corresponding holes in the top sleeve and threaded into the threaded anchor holes 227 formed in the speaker housing 170 so as to secure the glow deck 900 to the top of the speaker unit 100. Power to the LEDs 951 is provided by the base speaker unit 100 through the 9-pin male connector 960 interfaced with the corresponding 9-pin female connector 301 on the top of the speaker unit 100. FIG. 9C is a compilation of various perspective, side and plan views of the assembled glow deck 900.

In operation, the glow deck 900 is attached to the base speaker unit 100 via the mechanical and electrical interfaces (e.g., the screws and 9-pin connector). Once connected, battery power from the base speaker unit 100 powers the LEDs 951 housed within the glow deck housing, which in turn light-up the semi-opaque top cover 910 to generate a glowing diffused light that can provide an ambient light or a lantern for tent camping or other low light uses.

Figure 10A:
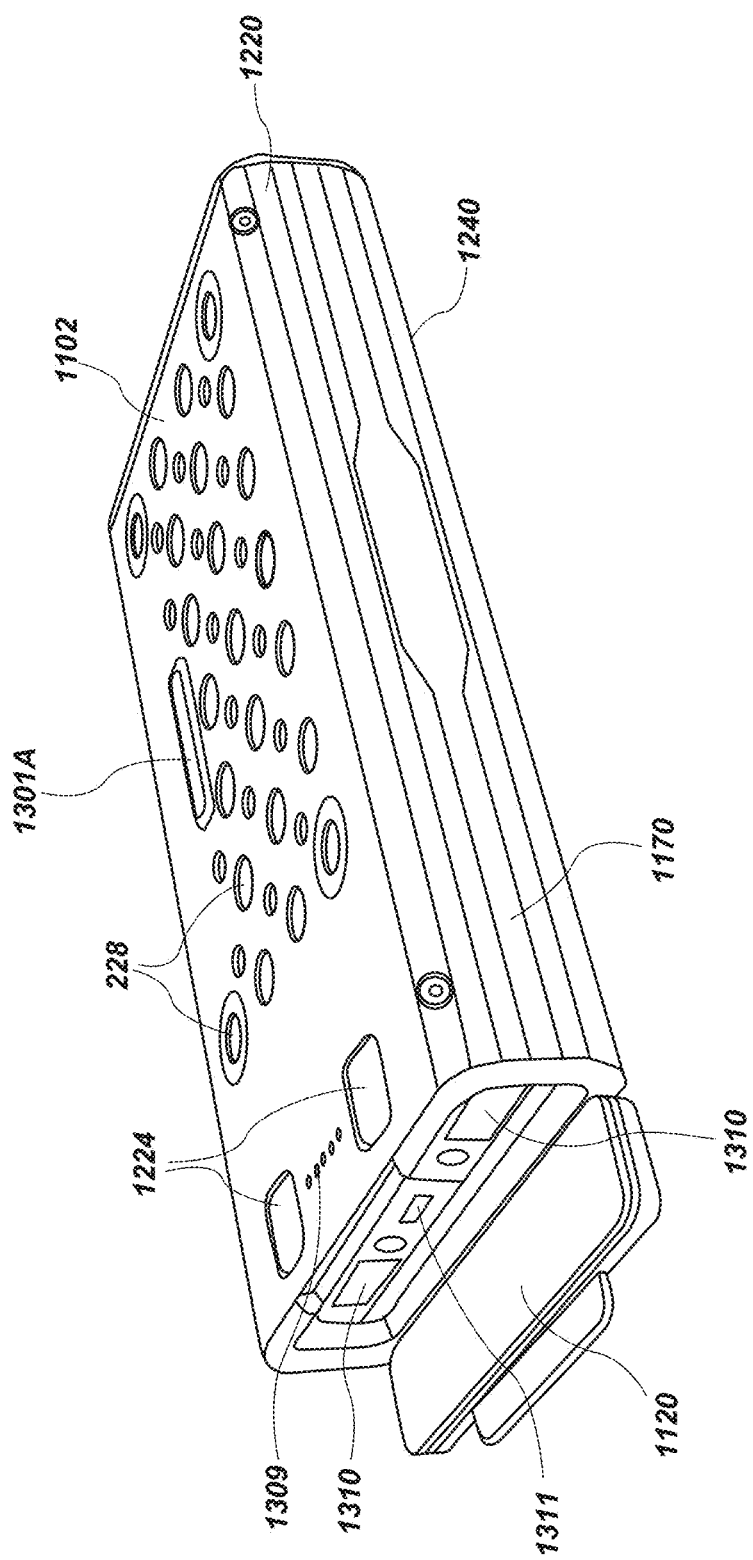
FIG. 10A is a front top side perspective view of a power bank 1000 accessory with the end cap open to reveal the internal USB and micro-USB ports.
Figure 10B:
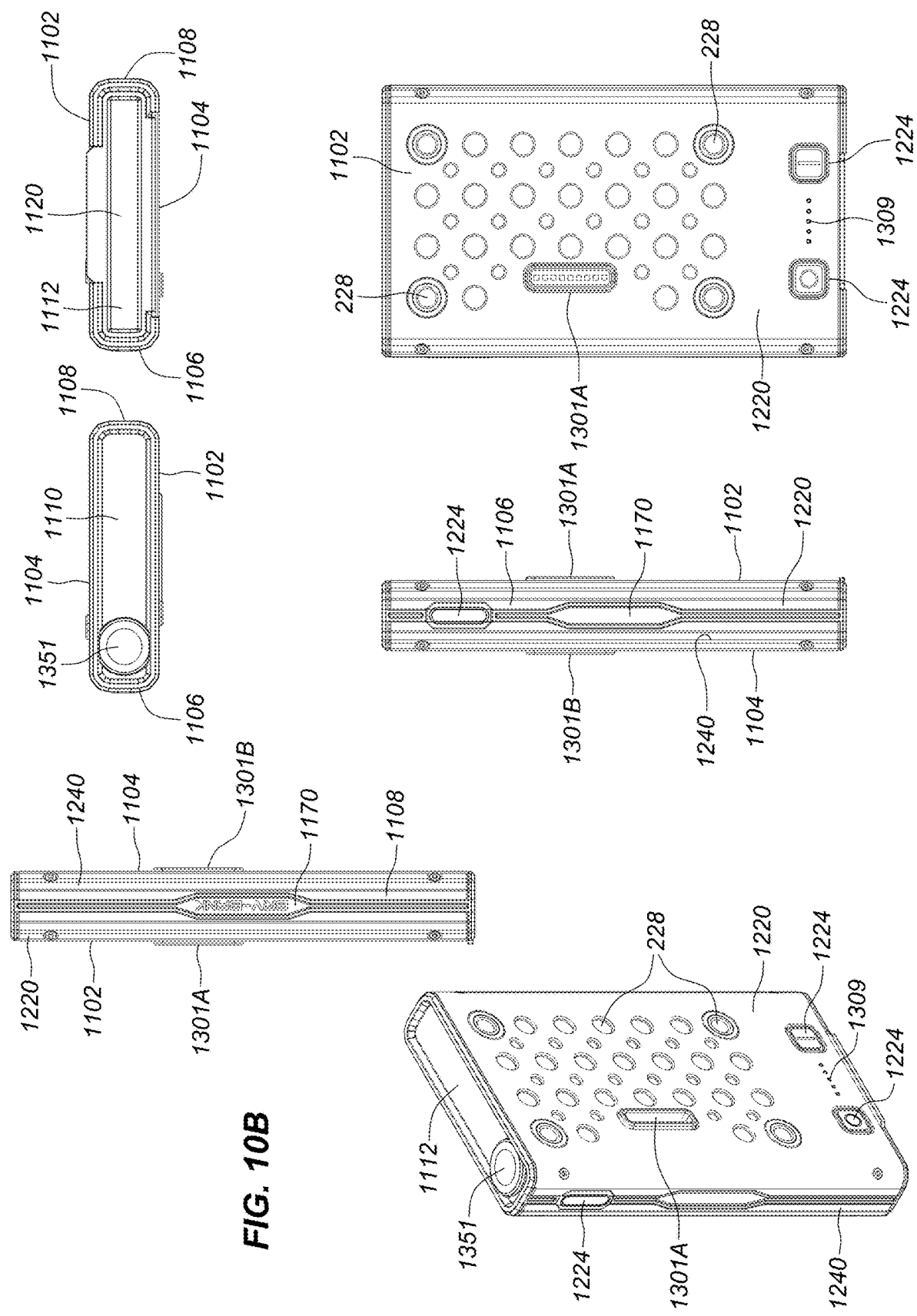
FIG. 10B is a compilation of perspective, side, and plan views of the power bank 1000 with the end cap closed.
Figure 11:
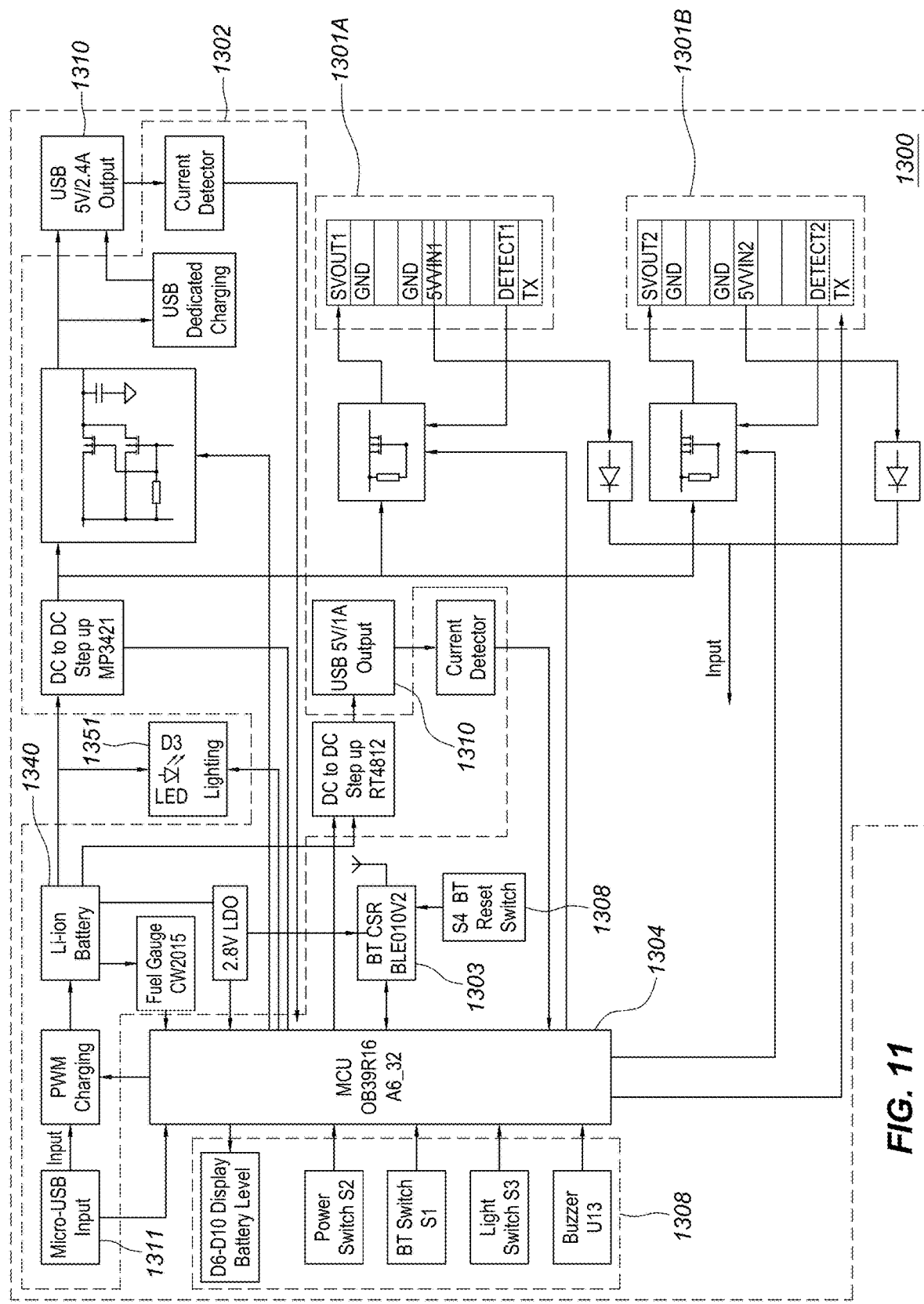
FIG. 11 is a block diagram of a representative circuit housed within the internal enclosure of the power bank 1000 depicted in FIG. 10A-10B.

FIGS. 10A-10B and FIG. 11 depict an implementation of a power bank 1000, which is capable of operating with the foregoing accessories in place of base speaker 100. The power bank 1000 also includes a flashlight 1351 and USB input and output ports 1311, 1310 capable of transferring power and/or data. The power bank can provide power to or receive power from the same accessories that connect to base speaker 100 through one or more 9-pin connectors 1301 (or stacking connectors or accessory connectors).

As illustrated in FIGS. 10A-10B and FIG. 11, the power bank 1000 includes top, bottom, right, left, rear, and front sides 1102, 1104, 1110, 1112, 1108, 1106, respectively and is comprised of an internal relatively rigid plastic housing or enclosure 1170 that houses one or more rechargeable batteries 1340, a wireless module 1303, a flashlight 1351, and interfaces or ports 1310, 1311.

The power bank 1000 enclosure 1170 may be configured to be sealed and water resistant or water proof. The enclosure 1170 may be comprised of a unitary integrally formed polymer molded or extruded construct that includes multiple apertures for functional elements such as USB communication or charging ports 1310, 1311, user control buttons 1224, battery power indicator 1309, and 9-pin connectors 1301, each of which may be independently sealed, as previously described, to the enclosure to inhibit ingress of fluid and particulate matter.

Power bank 1000 may be charged through a USB input 1311. Power bank 1000 may power an electronic device through one or more USB outputs 1310. A first USB output 1310 may be configured to provide a 2.4 amp charge while a second USB output 1310 may be configured to provide a 1.0 amp output. In alternate embodiments, both USB outputs may equally provide 2.4 amps or 1.0 amps or other power currents as may be desired As illustrated, the exterior functional or user interface elements may be individually sealed or housed under a cap or end cap 1120 or cover plate 230 that mates with the chassis or housing 1170 and protects the electrical sockets and interfaces thereunder. The cap 1120 is hingedly attached to the left side 1112 of enclosure 1170 and may be closed and opened. The cap 1120 mates with corresponding locking elements of enclosure 1170 to secure cap 1120 in a closed position until actively disengaged and opened by a user.

The top and bottom mounting sleeves 1220, 1240 externally encase most of the top and bottom sides 1102, 1104 of internal enclosure 1170 and extend over top and bottom portions of rear and front sides 1108, 1106. A gap between top mounting sleeve 1220, 1240 exposes internal enclosure 1170 along a center line of rear and front sides 1108, 1106 running from left side 1112 to right side 1110. The top sleeve 1220 may include apertures for a battery power indicator 1309 and to allow user control buttons 1224, such as power button and pair button, to be accessible by the user. Another user control button 1224, such as a flashlight button configured to switch the flashlight 1351, may be located on front side 1106 along the gap between top mounting sleeve and bottom mounting sleeve 1220, 1240 near the right side 1110.

The mounting sleeves 1220, 1240 include numerous holes 228, some of which may or may not be threaded to facilitate mounting of the accessory components with corresponding threaded screws 229. Some of holes 228 may include cavities formed in internal enclosure 1170 to allow hooks 432/532 to engage. The mounting sleeves 1220, 1240 can be made of metal such as aluminum or stainless steel or other suitable materials that may include fiber reinforced plastic or other polymer or composite materials. The sleeves can provide durable protection to the power bank 1000 by providing a hard, non-brittle and malleable skin to the power bank housing 1170. A user control button, such as the flashlight button, may be located in the gap between top mounting sleeve 1220 and bottom mounting sleeve 1240 on front side 1106 near right side 1110.

When the power bank 1000 is not connected to an accessory component or another power bank/base speaker, the top cover plate 230 may be mounted to the top side 1102 and/or bottom side 1104 of the power bank via four screws 229 that are threaded into threaded holes 227 that are formed (e.g., co-molded) on the housing 1170. In this way the cover plate 230 provides cosmetic appeal and also seals 9-pin connector 1301 thereunder from water and debris. Power bank 1000 and speaker 100 may use the same or different cover plates 230.

Flashlight 1351, disposed on right side 1110, may include a light source (e.g., an incandescent bulb or LED), a reflector below the bulb for directing light out of the power bank 1000, and a lens for focusing and/or protecting the light source. Flashlight 1351 draws power from battery 1340. Flashlight button 1224 may switch flashlight 1351 between multiple illumination modes including on, off, and various strobe or intermittent illumination patterns. Flashlight 1351 may include one or more light sources or individual light sources may be configured to illuminate at multiple pre-set intensity levels (e.g., flashlight 1351 may illuminate at 150 lumen, 300 lumen, or 500 lumen and may switch between levels when flashlight button 1224 is depressed). Flashlight 1351 can be waterproofed by, for example using silicone gaskets or glue to seal the lens to housing 1170, limiting or impeding ingress of fluids and debris from the external environment.

The top of power bank 1000 includes 9-pin connector 1301A and the bottom of power bank 1000 includes 9-pin connector 1301B. The 9-pin connectors 1301 (e.g., 1301A, 1301B) can be structurally similar to the 9-pin connector 301 of base speaker 100. The 9-pin connectors 1301A, 1301B are configured for passing power signals between the power bank 1000 and an accessory that is mounted to the top or bottom sleeve 1220, 1240. The 9-pin connectors 1301 can be female connectors or flat contact pad connectors, as shown. The 9-pin connectors 1301 can be waterproofed by, for example, using silicone gaskets or glue to seal the individual connector pins or pads, thereby limiting or impeding ingress of fluids and debris from the external environment into the connector and/or speaker housing. The power related lines of 9-pin connectors 1301 may be unpowered until turned on by power button 1224 (as described below), but it may still be preferable to attach cover plate 230 to provide additional protection from shorting the contacts. A resettable fuse may be included to disable or reset the circuit if the power related lines of 9-pin connector 1301 are over powered.

The 9-pin connectors 1301 of the power bank may be connected only to the power related lines (i.e. 5VOUT, ground, 5VVIN, detect accessory, and TX/RX (transmit/receive) line). Alternatively, the 9-pin connectors 1301 of the power bank may be connected to both the audio related and power related lines. The 9-pin connectors 1301 may include the TX or transmit line as the $9^{th}$ pin, and a similar $9^{th}$ pin transmit line may be employed in base speaker 100. Accessories may include an RX or receive line as the $9^{th}$ pin. Communication between the TX pin of the power bank 1000 or base speaker 100 and the RX pin of an attached accessory may be configured to enable instructions to be sent from the power bank or base speaker to the accessory.

As previously noted, the power bank 1000 may include one or more batteries 1340. Multiple batteries 1340 inside of power bank 1000 may be arranged in series, parallel, or a combination thereof to operate as a single battery with increased capacity and/or voltage. For example, in one configuration, two 3.7 volt 3000 milliAmp hour Lithium-Ion batteries wired in parallel may operate as a single 3.7 volt 6000 milliAmp hour Lithium-Ion battery. In another configuration, two 3.7 volt 3000 milliAmp hour Lithium-Ion batteries wired in series may operate as a single 7.4 volt 3000 milliAmp hour Lithium-Ion battery.

In operation, a short press on the power button 1224 turns on power to the 9-pin connectors 1301. A longer sustained press on the power button 1224 displays the battery status on battery level indicator 1309, and an even longer sustained press of power button 1224 will turn on power to the USB outputs 1310. The wireless pair button can have the function of turning on wireless communication (e.g. Bluetooth wireless) 1303 and/or activating the pairing mode to pair or connect a wireless device. A Bluetooth reset switch (1224, not shown) can reset the wireless communication connection with a wireless device.

Power bank 1000 may be stacked with either additional power banks 1000 or base speakers 100 using a power stack plate accessory (previously described) that directs power between stacked base speakers 100 and power banks 1000. Like a wired daisy chain, multiple power banks 1000 can be stacked one on top of the other using multiple power stack plate accessories (previously described) and power can be directly shared to each of the overlying or underlying power banks through the power pass through the power stack plate accessory positioned between each set of power banks and/or speakers. The power stack plate accessory serves also to bridge the gap between the female or flat connector contacts 1301 on each of the top and bottom power banks 1000 or speakers 100. FIG. 10B is a compilation of various perspective, side and plan views of the power bank 1000.

FIG. 11 is a block diagram of a representative circuit 1300 housed within the internal enclosure 1170 of the power bank 1000 depicted in FIG. 10A-10B. As illustrated in FIG. 11 the circuitry includes a top accessory connector 1301A, a power system 1302, a system controller 1304, a bottom accessory connector 1301B, a user interface 1308, and a Bluetooth connection 1303 that are connected to the system controller 1304, as illustrated. Accessories can be attached to the power bank 1000 through the top accessory connector 1301A and through the bottom accessory connector 1301B. Additional power banks 1000 and/or speakers 100 can be connected to one-another via the top or bottom accessory connectors 1301 as described.

An accessory attached to the stacking connector 1301 can provide power to the power bank 1000. The attached accessory can also receive power or receive communication from the power bank 1000. The speaker can provide power to an accessory through the top stacking input 1301A, the bottom stacking input 1301B, or through a USB output 1310. Power to the accessories can be toggled by holding and releasing a power button 1224 for less than a predetermined period of time, for example, one second.

Separate stacking plates allow two power banks or speakers to attach together through the 9-pin connectors 1301.

Power comes into the power bank via the stacking connectors 1301 or the USB input 1311. Data comes into the power bank via the stacking connectors 1301, the USB input 1311, the USB output 1310, and the Bluetooth (or other wireless) connection 1303. As shown in FIG. 11, power received from the top stacking connector 1301A can be routed to bottom stacking connector 1301B.

The power system 1302 comprises a USB input (e.g., Micro-USB input) 1311, a rechargeable battery 1340, a charger (e.g., PWM charging), low-dropout regulators (e.g., 2.8V LDO shown once, but may include multiple elements), DC/DC boost converters (e.g., MP3421, RT4812), and is connected to a pair of USB out ports 1310. The rechargeable battery 1340 can be charged via the charger, which receives power either from the 5VVIN line of the stacking connectors 1301 or through the USB input 1311. The battery in turn can provide power to the low-dropout regulators, one of which provide power to a microcontroller (MCU, e.g., OB39R16) 1304, and another can be enabled/disabled by the MCU 1304, which provides power to the other components of the system such as the Bluetooth (BT) controller (e.g., BT CSR BLE010V2) 1303. The battery 1340 can also provide power to the DC/DC converter, which in turn provides power to the stacking connectors 1301 and the USB charging output 1310. The 5V output to the top stacking connectors 1301 and the USB outputs 1310 can be enabled/disabled via the MCU 1304. The DC/DC boost converter can be powered by the battery 1340 and can be enabled/disabled by the MCU 1304. Depending on the level of the incoming audio signal, the battery also supplies power directly to an audio amplifier (e.g., NS4215).

If the DETECT1/DETECT2 input on either of the accessory connectors 1301 is active, then the system controller or MCU 304 can send power to the accessory connectors 1301. The system controller 1304 can monitor the status of the battery 1340 through a fuel gauge (e.g., CW2015) and updates the LEDs (e.g., D6-D10) of the user interface 1308 to indicate the charge remaining in the battery. When the user interacts with user interface 1308, the system controller 1304 can process the intent. The system controller 1304 can also communicate to an installed accessory connected to the top accessory connector 1301 through the transmission line (e.g., TX).

The user interface 308 can be comprised of user I/O buttons (e.g., Power switch S2, BT switch S1, BT reset switch S4, and Light switch S3) 1224, battery power indicator 1309 (e.g, D6-D10 display Battery level), and a buzzer (e.g., Buzzer U13). The USB input ports 1311 and USB output ports 1310 may be located under the cap 120 so that access would require removal of the cap 120. When the user presses the power button 1224 for a long period, the system controller 1304 can display the battery level on the 5 LEDs of the battery power indicator 1309. When the user presses the power button 1224 for a short period, the system controller 1304 can enable or disable power to the accessory connectors 1301 and USB outputs 1310. The Bluetooth reset button can cause the system controller 1304 to reset the wireless connection. The Pair button can have several functions, for example, enable Bluetooth, initiate Bluetooth pairing, cancel Bluetooth pairing or factory reset the power bank, depending on the status of the power bank.

The accessory connectors 1301 can allow for the attached accessory to pass power into the power system 1302, pass power from the power system 1302 to the accessory, or allow for communication to the accessory from the system controller 1304. When the DETECT1 and/or DETECT2 pin is active, the system controller 1304 can allow power to pass from the power system 1302 to the accessory.

The block diagram 1300 is only representative of an implementing circuit. Other circuits may also be designed to effectuate the same or similar user functionality.

While a number of exemplary accessories have been described it should be understood that additional accessories can also be supported by the speaker main unit 100. For example, the speaker can also support a Bluetooth Low Energy (BLE) accessory that allows a user to turn the accessory on and off remotely from a smartphone over Bluetooth. A watch or clock accessory, a GPS or navigation accessory, or other lamp type accessories may be configured with a corresponding 9-pin or suitable connector and mechanical attachment mechanisms such as those described herein so that they can be powered by the speaker unit 100. In a preferred implementation, the connector pins of the connectors on the accessory components are preferably spring-loaded and gold plated to bias the connection to mate with the corresponding speaker connector and mitigate corrosion.

While the disclosure has been described in connection with specific examples and various embodiments, it should be readily understood by those skilled in the art that many modifications and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

The invention claimed is:

1. A wireless battery powered audio speaker system comprising:
    a housing;
    an attachment means connected to the housing at a first location, the attachment means to mechanically attach the housing to a housing of an accessory component;
    a system controller positioned within the housing;
    a wireless module positioned within the housing and electrically connected to the system controller, the wireless module configured to receive wireless signals from an external electronic device;
    an audio speaker mounted into the housing and electrically connected to the system controller;
    a rechargeable battery positioned within the housing and electrically connected to the system controller;
    an input port mounted to the housing and electrically connected to the system controller, the input port configured to receive power from an external source;
    a battery charging circuit positioned within the housing and electrically connected to the system controller and the rechargeable battery, the battery charging circuit being configured to charge the rechargeable battery when power is received through the input port;
    a first electrical interface connected to the housing at a second location separate from the mechanical interface, the first electrical interface adapted to electrically couple with the accessory component; and
    a second electrical interface connected to the housing at a third location separate from the mechanical interface and the first electrical interface, the second electrical interface adapted to communicate audio with an external device.

2. The wireless battery powered audio speaker system of claim 1, further comprising:
    a first accessory component that is configured to be detachably mountable to the main wireless battery powered audio speaker via at least one of the interfaces, the first accessory being adapted for providing a first predefined function; and
    a second accessory component that is configured to be detachably mountable to the main wireless battery powered audio speaker via at least one of the interfaces, the second accessory being adapted for providing a second predefined function that is different from the first predefined function.

3. The wireless battery powered audio speaker system of claim 1, wherein the first and second electrical interfaces are each comprised of electrical contact points and the first electrical interface includes a greater number of electrical contact points than the second electrical interface.

4. The wireless battery powered audio speaker system of claim 3, wherein the first electrical interface is configured to communicate both power and audio.

5. The wireless battery powered audio speaker system of claim 4, wherein the second electrical interface is configured on an opposing side of the housing from that of the first electrical interface.

6. The wireless battery powered audio speaker system of claim 1, further comprising a second wireless battery powered audio speaker identical to the first wireless battery powered audio speaker and an attachment accessory, wherein when the first wireless battery powered audio speaker is connected to the second wireless battery powered audio speaker, the second electrical interface of the first wireless battery powered audio speaker is electrically coupled to the first electrical interface of the second wireless battery powered audio speaker through the attachment accessory.

7. The wireless battery powered audio speaker system of claim 6, wherein the attachment accessory comprises a first electrical interface connected to a second electrical interface, the first electrical interface being adapted to electrically couple with the second interface of the first wireless battery powered audio speaker and the second electrical interface being adapted to electrically couple with the first electrical interface of the second wireless battery powered audio speaker, the attachment accessory being configured to mechanically engage with both the mechanical interface of the first wireless battery powered audio speaker and the mechanical interface of the second wireless battery powered audio speaker.

8. The wireless battery powered audio speaker system of claim 6, wherein the system controller of the first wireless battery powered audio speaker communicates audio to the second wireless battery powered audio speaker through the second electrical interface of the first wireless battery powered audio speaker.

9. The wireless battery powered audio speaker system of claim 8, wherein audio communicated to the second wireless battery powered audio speaker is received through the first electrical interface of the second wireless battery powered audio speaker.

10. The wireless battery powered audio speaker system of claim 2, wherein the first accessory component and second accessory component are each configured to be fixedly attached to the mechanical interface and to electrically couple with the first electrical interface.

11. The wireless battery powered audio speaker system of claim 2, wherein the first predefined function of the first accessory component supplements the functionality of the first wireless battery powered audio speaker when the first accessory component is mounted to the first wireless battery powered audio speaker.

12. The wireless battery powered audio speaker system of claim 11, wherein the second predefined function of the second accessory component supplements the functionality of the first wireless battery powered audio speaker when the second accessory component is mounted to the first wireless battery powered audio speaker.

13. The speaker system of claim 2, wherein the first accessory comprises a solar panel and circuitry configured to transfer power to the rechargeable battery through the first electrical interface.

14. The speaker system of claim 2, wherein the first accessory comprises a wireless charging pad and circuitry configured to wirelessly charge an electronic device, the wireless charging pad being configured to transfer power from the internal base battery through the first electrical interface.

15. The speaker system of claim 2, wherein the first accessory comprises a second rechargeable battery and circuitry configured to transfer power from the second rechargeable battery to the rechargeable battery through the first electrical interface.

16. The speaker system of claim 2, wherein the first accessory comprises a light emitting element and circuitry configured to illuminate the light emitting element with power being provided by the rechargeable battery through the first electrical interface.

17. The wireless battery powered audio speaker system of claim 1, wherein the first electrical interface comprises a multi-pin connector having at least one pin to transmit power and the second electrical interface comprises a multi-pin connector to transmit audio.

18. A wireless battery powered audio speaker system comprising:
   first and second battery powered audio speakers, each separately comprising:
      a housing;
      a mechanical interface connected to the housing and adapted to mechanically connect the housing to a housing of one or more accessory components;
      a system controller positioned within the housing;
      a wireless module positioned within the housing and electrically connected to the system controller, the wireless module being configured to receive wireless signals from an external electronic device;
      an audio speaker mounted into the housing and electrically connected to the system controller;
      at least one rechargeable battery positioned within the housing and electrically connected to the system controller;
      an input port mounted to the housing and electrically connected to the system controller, the input port being configured to receive power from an external source;
      a battery charging circuit positioned within the housing and electrically connected to the system controller and the at least one rechargeable battery, the battery charging circuit being configured to charge the at least one rechargeable battery when power is received through the input port;
      a first electrical interface separate from the mechanical interface, the first electrical interface connected to the housing and being comprised of a first quantity of female contact pads, the first electrical interface being adapted to electrically couple with an accessory component; and
      a second electrical interface separate from the mechanical interface and the first electrical interface, the second electrical interface connected to the housing and being comprised of a second quantity of female contact pads, the second quantity being fewer than the first quantity, the second electrical interface being adapted to communicate audio to an external device;
   an attachment accessory comprising:
      a first attachment electrical interface comprised of male connector pins, the first attachment electrical interface being adapted to electrically couple with the second interface of the first wireless battery powered audio speaker;
      a second attachment electrical interface comprised of male connector pins, the second attachment electrical interface being adapted to electrically couple with the first electrical interface of the second wireless battery powered audio speaker; and
      wherein the attachment accessory is configured to mechanically engage with both the mechanical interface of the first wireless battery powered audio speaker and the mechanical interface of the second wireless battery powered audio speaker.

19. A system for electrically attaching an attachment accessory to a speaker, the system comprising:
   an audio speaker housing;
   a sleeve coupled to an outside surface of the audio speaker housing;

an attachment means connected to the sleeve to mechanically attach the housing to a housing of an accessory component;
a system controller positioned within the audio speaker housing;
a wireless module positioned within the audio speaker housing and electrically connected to the system controller, the wireless module configured to receive wireless signals from an external electronic device;
an audio speaker mounted into the audio speaker housing and electrically connected to the system controller;
at least one rechargeable battery positioned within the housing and electrically connected to the system controller;
an input port mounted to the housing and electrically connected to the system controller, the input port configured to receive power from an external source;
a battery charging circuit positioned within the audio speaker housing and electrically connected to the system controller and the at least one rechargeable battery, the battery charging circuit configured to charge the at least one rechargeable battery when power is received through the input port;
a first electrical interface connected to the audio speaker housing at a first location, the first electrical interface adapted to electrically couple with the accessory component; and
a second electrical interface connected to the audio speaker housing at a second location, the second electrical interface adapted to communicate with an external device.

* * * * *